(12) United States Patent
Curtis

(10) Patent No.: US 12,125,807 B2
(45) Date of Patent: Oct. 22, 2024

(54) KIOSK GIFT CARD SYSTEM AND METHOD

(71) Applicant: James Curtis, Carrollton, TX (US)

(72) Inventor: James Curtis, Carrollton, TX (US)

(*) Notice: Subject to any disclaimer, the term of this patent is extended or adjusted under 35 U.S.C. 154(b) by 0 days.

(21) Appl. No.: 18/377,193

(22) Filed: Oct. 5, 2023

(65) Prior Publication Data

US 2024/0047382 A1    Feb. 8, 2024

Related U.S. Application Data

(63) Continuation-in-part of application No. 18/010,728, filed as application No. PCT/US2021/040840 on Jul.
(Continued)

(51) Int. Cl.
*H01L 23/00*      (2006.01)
*H01L 21/48*      (2006.01)
(Continued)

(52) U.S. Cl.
CPC ........ *H01L 23/564* (2013.01); *H01L 21/4853* (2013.01); *H01L 21/4857* (2013.01); *H01L 21/4871* (2013.01); *H01L 23/367* (2013.01); *H01L 23/5383* (2013.01); *H01L 23/5386* (2013.01); *H01L 23/5389* (2013.01); *H01L 23/552* (2013.01)

(58) Field of Classification Search
CPC .......................... H01L 23/564; H01L 21/4853; H01L 21/4857
USPC ......................................................... 257/659
See application file for complete search history.

(56) References Cited

U.S. PATENT DOCUMENTS 5,206,814 A    4/1993  Cahlander et al.
5,679,944 A   10/1997  Cusey et al.
(Continued)

FOREIGN PATENT DOCUMENTS

CN    101207785    6/2008
JP    2008140215   6/2008
(Continued)

OTHER PUBLICATIONS

"Brad Stone, ""Software That Copies DVDs is on Trial""", http://www.nytimes.com/2009-04-24technology/2...html?_r=2&partner=rss&emc=rss&pagewanted=print, 3 pp".
(Continued)

*Primary Examiner* — Allyson N Trail
(74) *Attorney, Agent, or Firm* — James H. Ortega; Carstens, Allen & Gourley, LLP

(57) ABSTRACT

A gift card system and method for purchasing both physical and digital gift cards at a kiosk, both physical and virtual, is disclosed. The system/method includes a gift card distribution kiosk located at a retail establishment or online that provides a user with access to a multitude of different forms of gift cards that may be purchased and printed onto a customizable card with a personalized message. The kiosk includes a kiosk processor interface, a gift card dispenser, a card reader and gift card management server connected to a network. The gift card management server, through the kiosk processor interface, provides vendor options to users to select and pay via the card reader. The kiosk may be used to redeem unused user gift cards for a reduced value user selected gift card, reduced cash value, full value store card, rewards points, bank debit, and/or electronic code user towards online purchases.

20 Claims, 16 Drawing Sheets

Related U.S. Application Data 8, 2021, now Pat. No. 11,967,215, which is a continuation of application No. 16/925,144, filed on Jul. 8, 2020, now Pat. No. 10,846,684, which is a continuation-in-part of application No. 16/792,735, filed on Feb. 17, 2020, now Pat. No. 11,379,810, which is a continuation-in-part of application No. 16/667,088, filed on Oct. 29, 2019, now abandoned, which is a continuation of application No. 15/359,447, filed on Nov. 22, 2016, now Pat. No. 9,679,287, which is a continuation of application No. 14/697,318, filed on Apr. 27, 2015, now Pat. No. 9,508,064, which is a continuation of application No. 14/596,990, filed on Jan. 14, 2015, now Pat. No. 10,460,311, which is a continuation-in-part of application No. 13/108,837, filed on May 16, 2011, now abandoned, which is a continuation-in-part of application No. 12/839,294, filed on Jul. 19, 2010, now abandoned, which is a continuation-in-part of application No. 12/505,342, filed on Jul. 17, 2009, now abandoned.

(51) Int. Cl.
| | |
|---|---|
| *H01L 23/367* | (2006.01) |
| *H01L 23/538* | (2006.01) |
| *H01L 23/552* | (2006.01) |

(56) References Cited

U.S. PATENT DOCUMENTS

| | | | |
|---|---|---|---|
| 5,892,900 | A | 4/1999 | Ginter et al. |
| 6,092,054 | A | 7/2000 | Tackbary et al. |
| 6,092,105 | A | 7/2000 | Goldman |
| 6,193,155 | B1 | 2/2001 | Walker et al. |
| 6,226,618 | B1 | 5/2001 | Downs et al. |
| 6,532,201 | B1 | 3/2003 | Hogan |
| 6,655,580 | B1 | 12/2003 | Ergo et al. |
| 6,748,539 | B1 | 6/2004 | Lotspiech |
| 7,108,171 | B1 | 9/2006 | Ergo et al. |
| 7,225,982 | B2 | 6/2007 | Morrison et al. |
| 7,478,143 | B1 | 1/2009 | Friedman et al. |
| 7,494,048 | B2 | 2/2009 | Gusler et al. |
| 7,536,324 | B2 | 5/2009 | Perkowski |
| 8,089,655 | B2 | 1/2012 | Elarde et al. |
| 8,162,383 | B2 | 4/2012 | Curtis |
| 8,482,413 | B2 | 7/2013 | Martin |
| 8,571,983 | B1 | 10/2013 | Blackhurst et al. |
| 9,064,268 | B2 | 6/2015 | Larrick et al. |
| 9,785,931 | B2 | 10/2017 | Dwyre et al. |
| 9,972,044 | B1 | 5/2018 | Russell |
| 10,319,173 | B2 | 6/2019 | Adelberg et al. |
| 10,643,261 | B2 | 5/2020 | Kressler |
| 10,919,173 | B2 | 2/2021 | Bucks |
| 2001/0029583 | A1 | 10/2001 | Palatov et al. |
| 2002/0095680 | A1 | 7/2002 | Davidson |
| 2002/0103711 | A1 | 8/2002 | Karas et al. |
| 2003/0135465 | A1 | 7/2003 | Lee et al. |
| 2003/0177928 | A1 | 9/2003 | Harris |
| 2004/0034785 | A1 | 2/2004 | Tai et al. |
| 2004/0254940 | A1 | 12/2004 | Brush |
| 2005/0018216 | A1 | 1/2005 | Barsness et al. |
| 2005/0038714 | A1 | 2/2005 | Bonet et al. |
| 2005/0049931 | A1 | 3/2005 | Wisnudel et al. |
| 2005/0071045 | A1 | 3/2005 | Clini |
| 2005/0076020 | A1 | 4/2005 | Huntley et al. |
| 2005/0096936 | A1 | 5/2005 | Lambers et al. |
| 2005/0102191 | A1 | 5/2005 | Heller |
| 2005/0114205 | A1 | 5/2005 | Nelson et al. |
| 2005/0149446 | A1 | 7/2005 | Le Pannerer et al. |
| 2005/0172122 | A1 | 8/2005 | Risan et al. |
| 2005/0227773 | A1 | 10/2005 | Lu et al. |
| 2006/0011716 | A1 | 1/2006 | Perkowski |
| 2006/0028398 | A1 | 2/2006 | Willmore |
| 2006/0036549 | A1 | 2/2006 | Wu |
| 2006/0074679 | A1 | 4/2006 | Pifer et al. |
| 2006/0235755 | A1 | 10/2006 | Meueller |
| 2006/0235864 | A1 | 10/2006 | Hotelling et al. |
| 2006/0259426 | A1 | 11/2006 | Blama |
| 2007/0067340 | A1 | 3/2007 | Lakamp et al. |
| 2007/0075134 | A1 | 4/2007 | Perlow et al. |
| 2007/0181674 | A1 | 8/2007 | Taylor et al. |
| 2007/0203788 | A1 | 8/2007 | Andilib et al. |
| 2007/0214369 | A1 | 9/2007 | Roberts et al. |
| 2007/0228162 | A1 | 10/2007 | Phillips |
| 2007/0282747 | A1 | 12/2007 | Shen et al. |
| 2008/0005025 | A1 | 1/2008 | Legere et al. |
| 2008/0005802 | A1 | 1/2008 | Feirstein et al. |
| 2008/0082688 | A1 | 4/2008 | Yi et al. |
| 2008/0103974 | A1 | 5/2008 | Fridhendler et al. |
| 2008/0116259 | A1 | 5/2008 | Oberan |
| 2008/0189390 | A1 | 8/2008 | Heller et al. |
| 2008/0201386 | A1 | 8/2008 | Maharajh et al. |
| 2008/0235095 | A1 | 9/2008 | Oles et al. |
| 2008/0255901 | A1 | 10/2008 | Carroll et al. |
| 2009/0070122 | A1 | 3/2009 | Hauck et al. |
| 2009/0070258 | A1 | 3/2009 | Nguyen et al. |
| 2009/0117846 | A1 | 5/2009 | Mavrakakis |
| 2009/0154899 | A1 | 6/2009 | Barrett et al. |
| 2009/0193153 | A1 | 7/2009 | Thanos |
| 2009/0204855 | A1 | 8/2009 | Peters |
| 2009/0325602 | A1 | 12/2009 | Higgins et al. |
| 2010/0057563 | A1 | 3/2010 | Rauber et al. |
| 2010/0076010 | A1 | 3/2010 | Buttars |
| 2010/0078474 | A1 | 4/2010 | Rosenblatt et al. |
| 2010/0169652 | A1 | 7/2010 | Butler |
| 2010/0198726 | A1 | 8/2010 | Doran |
| 2010/0221938 | A1 | 9/2010 | Liu |
| 2010/0250347 | A1 | 9/2010 | Rainier et al. |
| 2011/0013501 | A1 | 1/2011 | Curtis |
| 2011/0015934 | A1 | 1/2011 | Rowe et al. |
| 2011/0093622 | A1 | 4/2011 | Hahn et al. |
| 2011/0099104 | A1 | 4/2011 | Nybom |
| 2011/0161409 | A1 | 6/2011 | Nair et al. |
| 2011/0314153 | A1 | 12/2011 | Bathiche et al. |
| 2012/0004770 | A1 | 1/2012 | Ooyen et al. |
| 2012/0011540 | A1 | 1/2012 | Pullford |
| 2012/0109787 | A1 | 5/2012 | Larrick et al. |
| 2012/0150343 | A1 | 6/2012 | Baric |
| 2013/0191170 | A1 | 11/2013 | Jarrett et al. |
| 2013/0297431 | A1 | 11/2013 | Deubell et al. |
| 2013/0329741 | A1 | 11/2013 | Deubell et al. |
| 2014/0229383 | A1 | 8/2014 | Wolfe |
| 2015/0278801 | A1 | 10/2015 | Friedlander |
| 2015/0294318 | A1 | 10/2015 | Hui et al. |
| 2016/0210466 | A1 | 7/2016 | Ortiz et al. |
| 2017/0011387 | A1 | 1/2017 | Lennon et al. |

FOREIGN PATENT DOCUMENTS

| | | |
|---|---|---|
| WO | 2000070517 | 11/2000 |
| WO | 2002032047 A1 | 4/2002 |
| WO | 2012100239 | 7/2012 |

OTHER PUBLICATIONS

"Kaleidescape 1080p Player, KPLAYER-6000", 2 pp.
"Kaleidescape Conductor", www.kaleidescape.com.
"Mod Systems Corporate Backgrounder", Jan. 2009, 3 pp.
"Object Storae: A Dell Point of View"; Dell Inc., Round Rock, Texas, USA, Dec. 9, 2010; 11 pp.
"VCAS Verimatrix Content Security Manager"; Verimatrix, Inc.; San Diego, CA, USA; Aug. 29, 2010; 2 pp.
VCAS Verimatrix ViewRight STB for IPTV; Verimatrix, Inc .; San Diego, CA, USA; Aug. 29, 2010; 2 pp.
Chris Albrecht, "MOD Systems Sees Video delivery Via SD Cards", Jan. 8, 2009, 3 pp.
Panasonic Ideas for Life, http://www2.panasonic.com/consumer-electronics/shop/Video/Blu-ray-Disc-Players/model . . . , 2 pp.

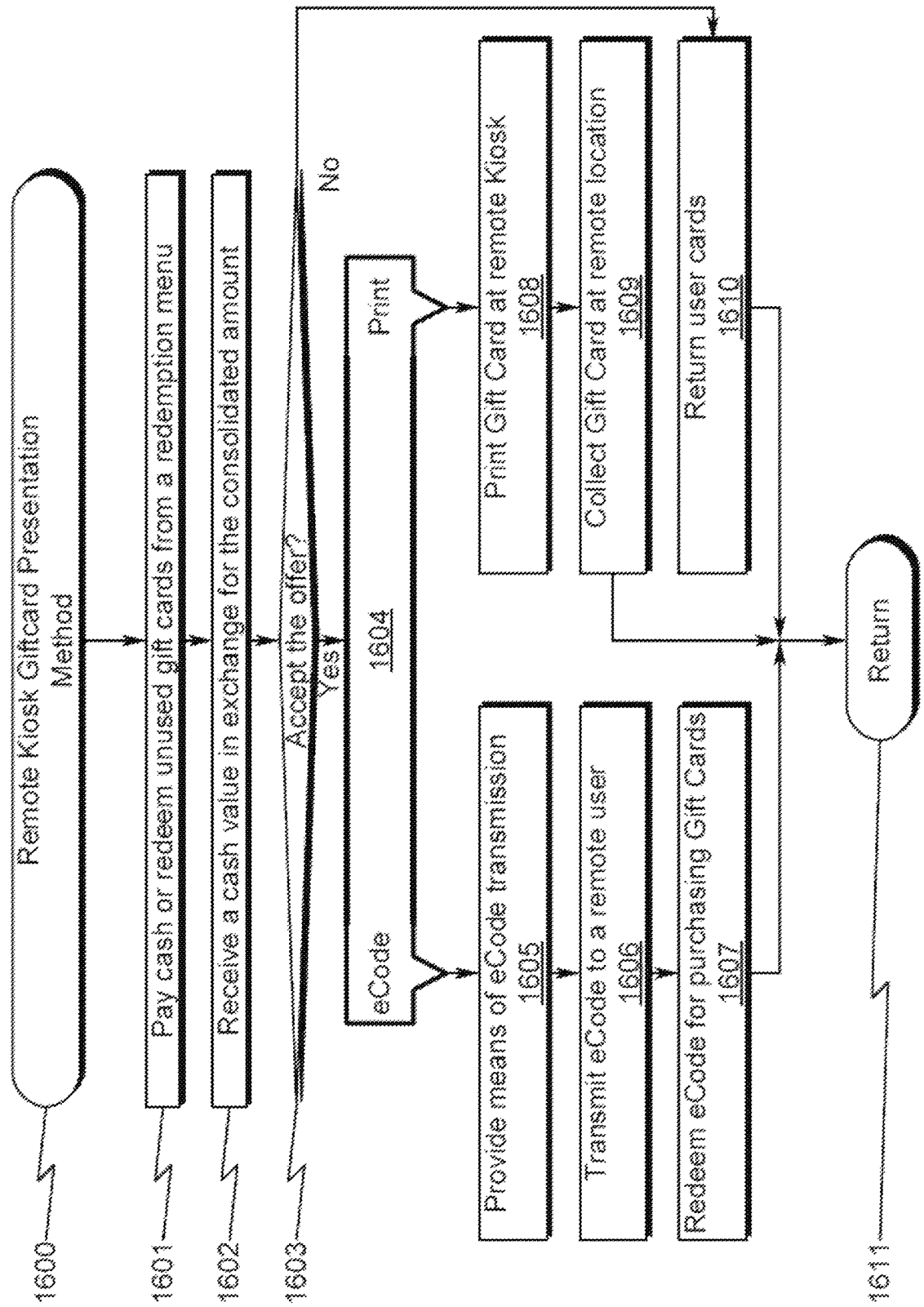

KIOSK GIFT CARD SYSTEM AND METHOD

CROSS REFERENCE TO RELATED APPLICATIONS

This disclosure is a continuation-in-part of U.S. application Ser. No. 18/010,728, filed Dec. 15, 2022, now U.S. Pat. No. 11,967,215, which is a national stage filing from international application No. PCT/2021/040840, filed Jul. 8, 2021, which claims priority to U.S. application Ser. No. 16/925,144, filed Jul. 9, 2020, now U.S. Pat. No. 10,846,684 which is a continuation-in-part of U.S. application Ser. No. 16/792,735, filed Feb. 17, 2020, now U.S. Pat. No. 11,379,810, which is a continuation-in-part of U.S. application Ser. No. 16/667,088, filed Oct. 29, 2019, now abandoned, which is a continuation of U.S. application Ser. No. 15/359,447, filed Nov. 22, 2016, now U.S. Pat. No. 9,679,287, which is a continuation of U.S. application Ser. No. 14/697,318, filed Apr. 27, 2015, now U.S. Pat. No. 9,508,064, which is a continuation of U.S. application Ser. No. 14/596,990, filed Jan. 14, 2015, now U.S. Pat. No. 10,460,311, which is a continuation-in-part of U.S. application Ser. No. 13/108,837, filed May 16, 2011, now abandoned, which is a continuation-in-part of U.S. application Ser. No. 12/839,294, filed Jul. 19, 2010, now abandoned, which is a continuation-in-part of U.S. application Ser. No. 12/505,342, filed Jul. 17, 2009, now abandoned.

TECHNICAL FIELD OF THE INVENTION

The present invention relates generally to gift cards and more particularly to purchasing vendor specific gift cards and exchanging unused gift cards at a kiosk.

PRIOR ART AND BACKGROUND OF THE INVENTION

Prior Art Background

Gift cards can be perceived as a quintessential cop-out gift, pegging the gift-giver as lazy or impersonal. While that may be true of the preloaded value cards that big chain stores put out and that can be found in virtually every drugstore now, small businesses have the advantage of developing gift card offerings that are good for more than just cash on a card. However, current gift card offerings do not provide a convenient method to purchase the gift card except to physically visit the store.

A fixed-money amount for a gift card limits the gift giver in what they are able to spend. Typically, people have long holiday gifts lists and a budget for how much they want to spend on each person, but they will be more likely to spend $150 if they know, for example, that they are buying someone a deluxe spa package. However, most gift cards available in stores have a logo or print with the face value of the card. Therefore, there is a need for a customizable gift card available to customers at a convenient location.

Often times, the people who are buying gift cards are not the regular customers. So, if they don't know anything about the business, then they are not going to know how much to spend. Providing customers with the opportunity to purchase different types of packages helps them feel like they are providing a more personalized gift. Therefore, there is a need for providing customizable and personalized gift card options to consumers.

Convenience plays a big role in the purchasing of gift cards during the holidays. While not everyone buys their gifts online, most people will at some point be browsing the web for gift ideas during these final weeks, and the more they come across your website while shopping, the better. Anyone can easily go to the big box stores for the standard gift offerings, but most people would rather give a gift that is local to the recipient and shows that they put some thought into the purchase.

Customers enjoy the sheer convenience of sending the certificate in an email with a personalized message, or if they are seeing the person, they can print out the certificate and hand it to them. Either way, there is an element of personalization to it because you can write your own message and choose the background for the certificate. Therefore, there is a need for a personalizing gift cards at a local convenience or retail store kiosk.

Some recipients of gift cards do not necessarily use the cards due to several reasons. Currently, there are no systems to redeem unused gift cards for cash, reduced value gift cards, rewards points, check, automatic bank debit, store credit (digital or store credit gift card), or an eCode for applying to online purchases.

Deficiencies in the Prior Art

The prior art as detailed above suffers from the following deficiencies:
- Prior art systems do not provide for a convenient method to purchase the gift card except to physically visit the store.
- Prior art systems do not provide for customizable gift cards available to customers at a convenient location.
- Prior art systems do not provide for providing personalized gift card options to consumers.
- Prior art systems do not provide for exchanging unused gift cards for a reduced cash offer.
- Prior art systems do not provide for exchanging unused gift cards for a reduced value gift card offer for a preferred gift card of choice.
- Prior art systems do not provide for redeeming unused gift cards for a full value store credit.
- Prior art systems do not provide for redeeming unused gift cards for rewards points.
- Prior art systems do not provide for redeeming unused gift cards for a promotional code that could be used for online purchases.
- Prior art systems do not provide for redeeming unused gift cards for a promotional code that could be used at a different location for printing customizable gift cards.

While some of the prior art may teach some solutions to several of these problems, the core issue of purchasing gift cards at a kiosk has not been addressed by prior art.

OBJECTIVES OF THE INVENTION

Accordingly, the objectives of the present invention are (among others) to circumvent the deficiencies in the prior art and affect the following objectives:
- Provide for a convenient method to purchase the gift card by physically visit the kiosk or via an online virtual kiosk interface accessed via a website or mobile application.
- Provide for customizable gift cards available to customers at a convenient location.
- Provide for providing personalized gift card options to consumers.
- Provide for exchanging unused gift cards for a reduced cash offer.

Provide for exchanging unused gift cards for a reduced value gift card offer for a preferred gift card of choice.

Provide for redeeming unused gift cards for a partial or full value store credit.

Provide for redeeming unused gift cards for rewards points.

Provide for redeeming unused gift cards for a promotional code (e.g., an eCode) that could be used for online purchases.

Provide for redeeming unused gift cards for a promotional code that could be used at a different location for printing customizable gift cards or creating digital gift cards.

Provide limited use gift cards that may have restrictions on their use for purchasing certain items or making purchases at certain merchants or within certain geographic locations.

Provide for the recording of personalized audio and/or visual messages from a purchaser to a receiver of a gift card to be played back when the receiver obtains the gift card or promotional code.

Provide for creation and presenting of a greeting card, with or without a gift card by a purchase and provided to a receiver of the gift card.

Provide for the creation of a limited number of "collector edition" gift cards, such as gift cards related to movies, TV shows, and musical artists.

Provide for purchasing encoded tickets for events via a disclosed kiosk, such as for concerts, plays, and sporting events.

Provide for purchasing gifts in the form of gift cards or eCodes for downloading or streaming video games or music, whether specific tracks or entire albums.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention in various embodiments addresses one or more of the above objectives in the following manner. The present invention provides a kiosk gift card system for purchasing gift cards at a kiosk, which may be a physical kiosk accessed in person or may be a virtual kiosk accessed online. The physical system includes a gift card distribution kiosk located at a retail establishment, while a virtual system includes an online virtual kiosk interface, that provides a user with access to a multitude of different forms of gift cards that may be purchased and printed onto a customizable card with a personalized message. The physical kiosk includes a kiosk processor interface, a gift card dispenser, a card reader, and gift card management server connected to a network. A virtual kiosk may include the kiosk processor interface accessible via a network and a gift card management server or interface connected to the network. The gift card management server, through the kiosk processor interface, provides vendor options to users to select and pay via the card reader or by otherwise providing payment information to the kiosk processor interface. In another embodiment, the kiosk or virtual kiosk is used to redeem unused user gift cards for a reduced value user selected gift card, reduced cash value, full value store card, rewards points, bank debit, and/or electronic code user towards online purchases.

Method Overview

The present invention system may be utilized in the context of an overall kiosk gift card purchase method, wherein the kiosk gift card system as described previously is controlled by a method having the following steps:

(1) clicking on or otherwise accessing the kiosk processor interface;
(2) browsing through a list of vendors;
(3) selecting a vendor to purchase a gift card from the vendor;
(4) requesting a monetary amount to apply to the gift card;
(5) paying the monetary amount;
(6) printing and dispensing the gift card, or creating a virtual/digital gift card or eCode; and
(7) collecting the gift card via obtaining the physical gift card or receiving the gift card virtually/digitally or access to the virtual gift card virtually/digitally.

Integration of this and other preferred exemplary embodiment methods in conjunction with a variety of preferred exemplary embodiment systems described herein in anticipation by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 16 illustrates a flowchart describing a remote kiosk gift card presentation method according to a preferred exemplary embodiment of the present invention.

DESCRIPTION OF THE PRESENTLY PREFERRED EXEMPLARY EMBODIMENTS

Figure 1:
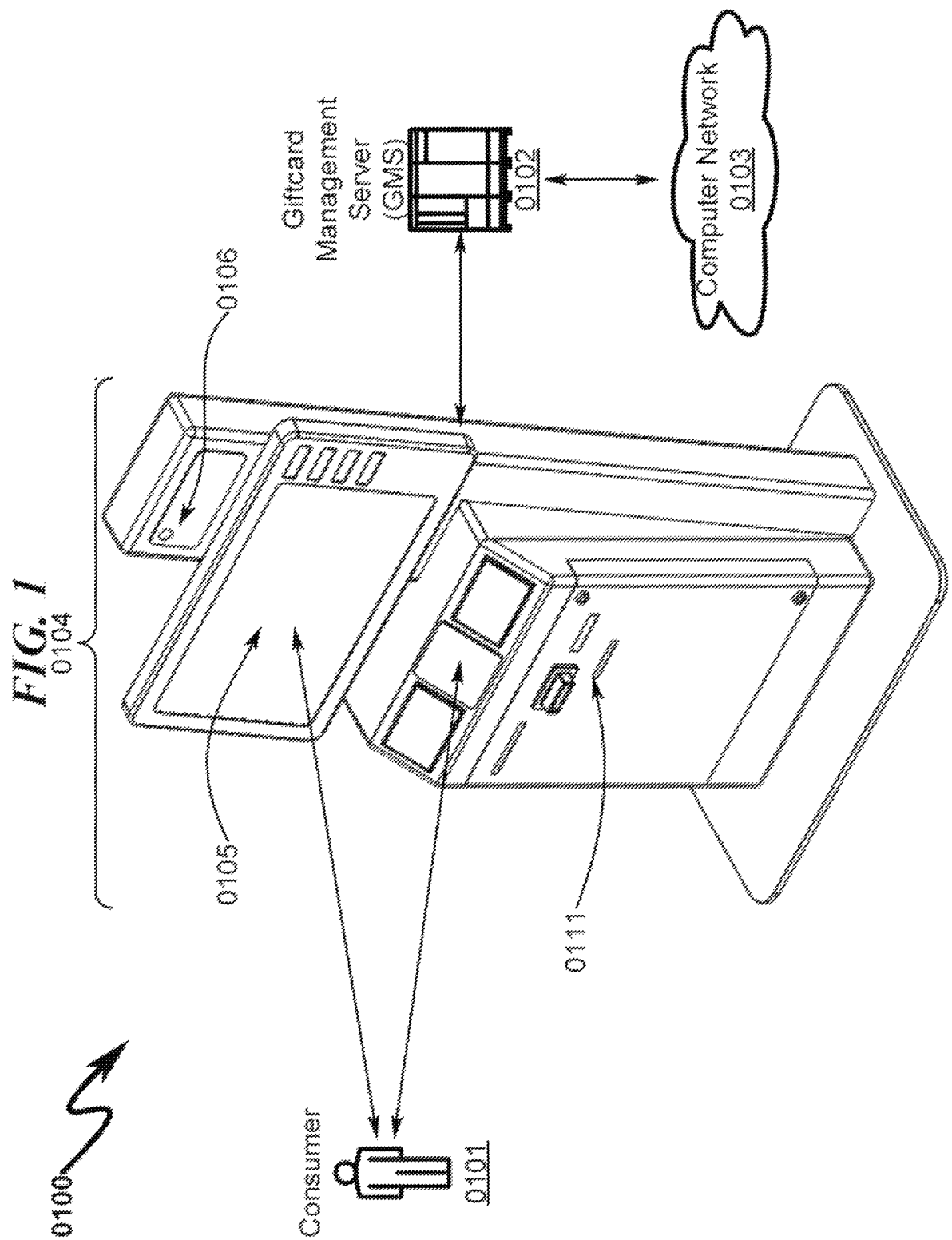
FIG. 1 illustrates an overall kiosk gift card system according to a preferred embodiment of the present invention.

While this invention is susceptible of embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a gift card system and method. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Preferred Exemplary Kiosk Gift Card System (0100)

The present invention may be seen in more detail as generally illustrated in FIG. 1 (0100), wherein a kiosk gift card system comprises a kiosk (0104) with a gift card dispenser (0111), a live interface portal (LIP) (0106), a kiosk processor interface (0105) that communicates with a gift card management server (0102). As discussed above, a virtual kiosk as disclosed herein may not include a gift card dispenser since virtual kiosks are accessed virtually over a network. The kiosk processor interface (0105) may be a touch user interface that is based upon the sense of touch or a graphical user interface (GUI) that may be navigated with a pointing device such as a mouse. A user (0101) may use the touch interface to interact and navigate the kiosk (0104). For a virtual kiosk, the interface may be interacted with using whatever input-output device the user has used to access the virtual kiosk platform or interface.

According to a preferred exemplary embodiment, a user may purchase a gift card at kiosk with the kiosk processor interface. The gift card may be customized to add a fixed value and also personalized to add a personal message or image on the card. A user may request a gift card for a specific vendor, for example Starbucks, and add a fixed amount, for example $90. In other embodiments, the gift card may be configured with a variable amount, and can thus be reloaded, as needed, with any particular amount. In addition, the vendor may not necessarily by limited to a particular merchant/retailer, but is instead one that provides gift cards that may be used at multiple retail locations, such as a VISA® or MasterCard® gift card.

Furthermore, the user may include a personalized message such as "Happy Holidays" or any other customized private message, as discussed herein, on the card. Additionally, the user may personalize the font, design, color, size, and position of the personalized message. In some embodiments, the personalized message may be audio and/or video messages recorded by the purchaser at the kiosk used to purchase the gift card. Such embodiments would allow a purchaser to record an audio/video message that would then accompany the gift card (or gift card eCode/electronic gift card or "e-gift card", etc.) such that when the receiver of the gift card obtains it, they would see/hear the personalized message recorded by the purchaser. Such playback could be played from the kiosk at, and during the time, which the receiver obtains the gift card, providing for a very personalized and special experience while receiving a gift card. Similarly, when the gift card is provided as virtual gift card, an eCode or other form of electronic payment vehicle or marker, the personalized recorded message could accompany the receipt of the eCode, etc., either at the kiosk visited by the receiver or even via the message by which the receiver receives the eCode or other form of payment vehicle, such as an email or a mobile message (away from a kiosk), an NFC transfer to the receiver's device or any other means by which the receiver receives the electronic gift card code, etc. either physically or via a device of the receiver.

Whether at a physical kiosk or a virtual kiosk, the kiosk processor interface (KPI) (0105) receives a purchase request from the user (0101) and forwards the request to a gift card management server (GMS) (0102). The GMS (0102) may then connect with the vendor of interest and receive a confirmation to print or reload the gift card. The GMS (0102) may then instruct a printer to print the gift card and dispense the gift card via the gift card dispenser (0111) at a physical kiosk after an amount has been paid with a card reader and a payment module. A physical gift card may also be selected from a virtual kiosk for printing at a physical kiosk or other authorized location, if desired. After a transaction is complete, the user may request real time support through a live interface portal (0106) such as a camera or an online chat on the KPI (0105). The user may also seek live support during the gift card transaction with the live interface portal (0106). The LIP (0106) may further communicate with a customer support center through (0103) a network and gift card management server (0102).

Preferred Exemplary Kiosk Gift Card System (0200)

Figure 2:
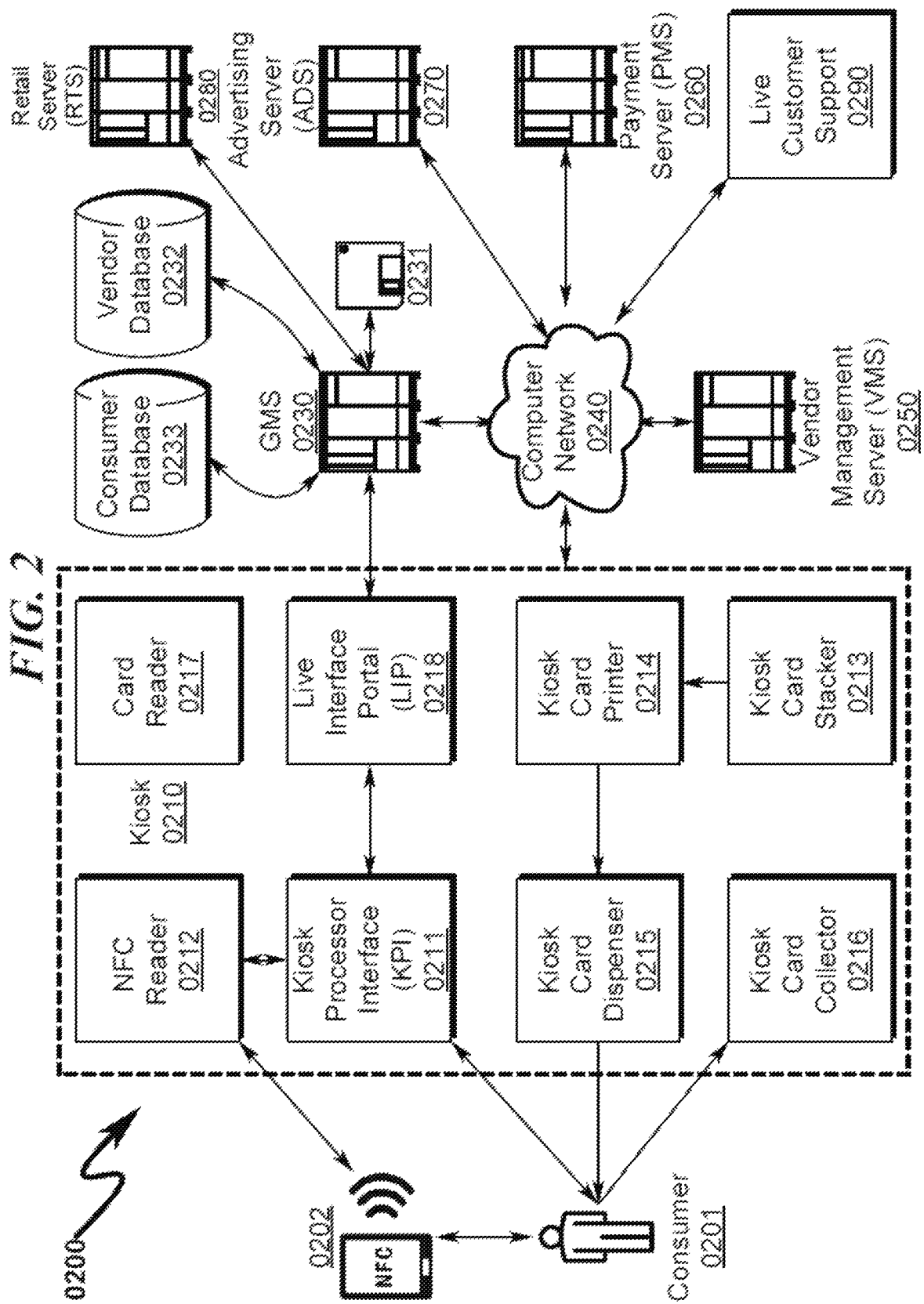
FIG. 2 illustrates a detailed kiosk gift card system according to a preferred embodiment of the present invention.

The present invention may be seen in more detail as generally illustrated in FIG. 2 (0200), wherein a user/consumer (0201) interacts with a kiosk gift card system located in a retail establishment. For example, the kiosk may be located in retail establishments such as Walmart, Home Depot, in a Mall, in a public event place such a sports stadium, in an office building etc. In some embodiments, the location of the kiosk may also impact the gift card amounts. More specifically, users may be offered additional "bonus" amounts on a gift card if the vendor they select is the vendor at which the kiosk is located. In embodiments where a second kiosk at a different location is used to print the gift card, which are discussed in further detail below, the "bonus" funds may be provided if the vendor at the location of the second kiosk is selected by the user/purchaser at the first kiosk. Such embodiments provide an incentive for the receiver of the gift card at the second location to patronize the retailer at that second location.

Also, as discussed in detail herein, the kiosk may be a virtual kiosk as disclosed herein, and thus is accessed from any network connected device rather than at a physical location of an establishment. As such, all discussions throughout this disclosure of a physical kiosk apply equally to embodiments having a virtual kiosk, with the unneeded physical components removed and perhaps replaced with virtual components accessible via the virtual kiosk interface.

The system comprises a kiosk (0210) with a kiosk processor interface (KPI) (0211) that communicates with a gift card management server (0230). The GMS (0230) may be physically connected directly to the kiosk (0210) or may be part of a virtual system or platform for virtual kiosks. The GMS (0230) may be remotely located so that may be accessible via the network (0240). An administrator may remotely monitor GMS (0230) via the network (0240). The network may be wired and may use protocols such as Ethernet. The network may be wireless and may use protocols such as 4G, LTE, and/or Bluetooth.

The KPI (0211) is configured for enabling users to interact with GMS (0230). The GMS (0230) may further comprise a microprocessor executing instructions read from a computer-readable medium (0231) and a graphical user interface (GUI) with a pointing device. An administrator may open a GUI and select vendor database (0232) for updating records. A more detailed view of GUI may be seen in FIG. 4 (0400).

A physical kiosk further comprises a Kiosk Card Stacker (0213) that maintains an inventory of blank cards equipped with or without a NFC device. The NFC device in a card may be enabled to communicate wirelessly with a NFC reader installed in a mobile computing device such as a smart phone or other NFC reader equipped devices. The blank cards may be configured to be in different sizes so as to enable users to choose a size. A Kiosk card printer (0214) may be connected physically to the Kiosk Card Stacker (0213). The Kiosk Card Stacker (0213) may automatically feed a blank card to the printer when it receives a print request. The print request may include information pertaining to the card size, personalized message, color, logo, value, and/or NFC chip. As mentioned above, such a physical kiosk may also be used to print purchased gift cards obtained via a virtual kiosk.

The kiosk processor interface (KPI) (0211) may receive a purchase/exchange request from a user (0201) which subsequently forwards the request to a gift card management server (GMS) (0230). The GMS (230) may then search the vendor database (0232) to check if the vendor exists on the database. If so, the GMS (0230) may connect with the vendor of interest via vendor management server (VMS) (0250) via network (0240) and receive a confirmation to print the gift card. The user may pay with a credit card or debit card for the requested amount with a card reader (0217). The user may also choose to pay in cash. The card reader may communicate via network (0240) with a payment server (0260) that authenticates the payment and sends a confirmation for the payment. The GMS (0230) may then instruct a printer (0214) to print the gift card and dispense the gift card via the gift card dispenser (0215). According to an exemplary embodiment, gift card manufacturing on demand (MOD) with a gift card kiosk enables a consumer to print a gift card on as needed basis.

The physical kiosk may also comprise a Near Field Communication (NFC) device (0212). The communication (NFC) is a standards-based short-range wireless connectivity technology that makes life easier and more convenient for consumers by making it simpler to make transactions, exchange digital content, and connect electronic devices with a touch. The user may use a mobile computing device (0202) equipped with a NFC reader to establish a NFC connection with the kiosk (0210). According to a preferred exemplary embodiment, the user (0201) may use the NFC device (0202) to pay for a gift card. The user may also receive a confirmation to the device (0202).

The physical kiosk (0210) may also be communicating via a communications network (0240) with an advertisement server ADS (0270) that is configured to display advertisements on the kiosk processor interface (0211). According to a preferred exemplary embodiment, the kiosk is enabled to target advertisements to the user through the advertising server (0270), and such advertisements may even be demographically based.

The physical kiosk (0210) may also use a card collector (0216) to gather unused gift cards that may be redeemed or exchanged for like kind gift cards or cash as described below in one of several methods. The unused cards may be recycled or reused for customized gift cards. As described further below, in virtual kiosk embodiments, prior existing gift cards may have their value transferred to through the virtual kiosk interface by inputting required gift card information, and then the user may dispose of or recycle the spent gift cards.

According to preferred exemplary embodiments, the kiosk in the retail establishment may be integrated into the retail network server (0280) to provide retailer specific value offers and discounts. For example, if the kiosk is located in Walmart, advertisements and offers related to Walmart may be displayed on the KPI (0211). Value Offers may also be presented to the user on a mobile computing device (MCD) (0202). The consumer may use the Value offers at check out with the MCD (0202) or print a paper copy at the kiosk.

Vendor Database (0232)

As illustrated below in Table 1.0, the vendor database (VBD) (0232) may further comprise vendor related information such as "Vendor Name", "Vendor ID", "Credit Limit", "Address" and "Gift Card Serial Number". The VDB (0232) may communicate with GMS (0230) or through a wired or wireless network. When a consumer requests a gift card, the KPI (0211) may process and forward the request to the GMS (0230). This would work the same for both physical and virtual kiosks. The GMS (0230) may determine the vendor from the request and issue a gift card with a serial number from the VDB (0232). If the requested gift card amount exceeds the Credit Limit for the vendor, the GMS (0230) may forward the request to a vendor management server (0250). The VMS (0250) may further communicate with the user requested vendor with the Address, for authorization upon which a customized gift card may be printed and dispensed to the requesting consumer.

TABLE 1.0

| Vendor Name | Vendor ID | Credit Limit | Address | Gift Card Serial No. |
|---|---|---|---|---|
| Vendor 1 | 58769 | $1,000 | www.vendor1.com | 5687587-576768 |
| Vendor 2 | 69789 | $500 | www.vendor2.com | 6687587-676769 |
| Vendor 3 | 96987 | $100 | www.vendor3.com | 7687587-776770 |
| Vendor 4 | 56876 | $500 | www.vendor4.com | 8687587-876771 |
| Vendor 5 | 64647 | $1,000 | www.vendor5.com | 9687587-976772 |

Consumer Database (0233)

As illustrated below in Table 2.0, the consumer database (CBD) (0233) may further comprise consumer related information such as "Consumer Name", "Consumer ID", "Credit Check", "Consumer Contact information", and "Consumer History". A single entry for example may contain information about a consumer 1 with a consumer ID 123-56-789 who has been credit checked. The CDB (0233) may also maintain consumer history and past purchases. For example, Consumer 1 may have purchased a Vendor 1 and Vendor 3 gift card. The consumer history, as well as demographics based on any collected consumer demographic information, may be analyzed further for presenting specific advertisements to consumers with an advertising server ADS (0270). It should be appreciated by anyone skilled in the art that the database may be maintained and stored in standard SQL or any industry DBMS standard.

TABLE 2.0

| Consumer Name | Customer ID | Credit Check | Customer Contact | History |
|---|---|---|---|---|
| Consumer 1 | 123-56-789 | Yes | 123-334-3456 | Vendor 1, Vendor 3 |
| Consumer 2 | 123-56-790 | Yes | 123-354-3457 | Vendor 3, Vendor 4 |
| Consumer 3 | 123-56-791 | No | 123-364-3458 | Vendor 2, Vendor 5 |
| Consumer 4 | 123-56-792 | Yes | 123-374-3459 | Vendor 4, Vendor 6 |
| Customer 5 | 123-56-793 | No | 123-384-3460 | Vendor 6, Vendor 7 |

Consumer Personalization

According to a preferred exemplary embodiment, consumer personalization may be used to provide specific customer history with real time evaluation and supported purchases. For example, from the aforementioned table 2.0, consumer 2 may be evaluated in real time based on past purchase history such as Vendor 3 and Vendor 4. The consumer 3 may be presented with an advertisement for Vendor 3 or Vendor 4 after identifying the consumer with the CDB (0233) and consumer ID.

Consumer History Macro (Total) & Micro (by Card)

According to a preferred exemplary embodiment, the CDB (0233) may also provide Macro reports for total customer specific history in a particular category. For example, a consumer's past history from the CDB (0233) may indicate purchases in a drug store and the specific information may be used to present drug store related advertisements or drug store related gift cards.

Similarly, the CDB (0233) may also provide Micro reports for specific customer history with a genre or historical favorites. For example, a consumer's past history or historical favorites may be analyzed and determined that a consumer is interested in sports. A history of all transactions on a particular card may also be analyzed and Consumer Card Balances According to a preferred exemplary embodiment, a consumer may use the KPI (0211) and obtain real time balance on a gift card directly or with a NFC device (0202) if it is a physical kiosk. A consumer (0201) may insert a gift card into card reader (0217) in the physical kiosk (0200), or enter the information in a virtual kiosk. The card reader (0202) may then determine the vendor ID based on the gift card information, or the KPI (0211) may do so in virtual kiosk embodiments. The GMS (0230) may then query the vendor database (0232) with the Vendor ID and receive a vendor address which may be used to login into a vendor management server (VMS) (0250). The VMS (0250) may then respond to the GMS (0230) with a gift card balance that may be presented to the consumer (0201) on the interface (0211). The gift card balance may also be wirelessly transmitted to the consumer's mobile device (0202) with the NFC reader (0212).

Consumer Direct Marketing

According to a preferred exemplary embodiment, the retailer system/kiosk interface provides customer specific advertising micro marketing material with the Advertising server (ADS) (0270). For example, when a consumer interfaces with the KPI (0211), the consumer may be identified with a consumer ID and the CDB (0233). The GMS (0230) may use the consumer information and forward it to an advertisement server ADS (0270) that is configured to serve advertisements. The ADS (0270) may serve advertisements directly to the consumer based on the consumer's past purchase history, as well as collected or determined consumer demographics, while the customer is waiting for a transaction. Proximity marketing applications may be employed to target user mobile phones using beaconing connectivity technology as part of the hardware component matrix. In such embodiments, users may have a mobile application affiliated with the kiosk, or even with retailers/merchants available through the kiosk, for provide such targeted advertisements.

Additionally, push advertisements may be transmitted directly to the consumer for promotions, coupons and product information. Retailer/merchant- and application-friendly integration may be provided at disclosed kiosks. Similarly, micro marketed promotions and discounts based on historical purchases or viewing may also be provided to a consumer.

Consumer Fraud Alerts

According to a preferred exemplary embodiment, the system/kiosk may provide "push" communication in the event of any issues with account usage or unauthorized access. When a user interfaces with KPI (0211), the consumer may be identified and if there is a history of misusage in the consumer's history, an alert may be communicated to the retail establishment. The alert may be transmitted with the network (0240), or an alarm may be sounded to notify concerned officials.

A system/kiosk in accordance with the disclosed principles provides both security and safeguards with features like control limitation. For example, a limit can be placed on the number of gift cards that can be purchased or exchanged in a single transaction. Similarly, a limit can be placed on how many transactions a single consumer may conduct within a predetermined about of time. Also, controls can be placed on the maximum amount that can be paid out (e.g., $500) for an exchange/consolidation transaction, or even for the purchase of new gift cards, if desired. Further, control features may also track the frequency of purchases based on "know your customer" (KYC) and "personal information requirements" as part of the exchange/consolidation of existing gift cards. In some embodiments, a driver's license scanner could be employed in a disclosed kiosk for capturing personal information of the user conducting a transaction. Also, a disclosed kiosk could require users to provide a credit or debit card that could be charged against in cases of fraud, and which the kiosk could be configured to valid with the card issuer prior to completing a transaction. All such information may be saved in a database to help identify fraudsters.

Other features of a disclosed physical kiosk to reduce or eliminate fraud is the inclusion of an exchange gift card ingestor. For example, upon acceptance of an exchange offer but before the transfer of funds to another gift card, the system/kiosk could require the consumer to insert the exchanged card(s) into the ingestor for storage in a secure lockbox or destruction within the kiosk.

With the above-mentioned anti-fraud features, a system or kiosk in accordance with the disclosed principles and reduce or prevent fraud in numerous situations, which include but are not limited to, situations like:

Fraudsters find ways to lift numbers from inactivated cards displayed on pegs in a retailer by removing/replacing packaging or reverse engineering the card number sequences to get access to card numbers. They then wait for those cards to be activated and then spend that value before the true purchaser of that card can use it. A system or kiosk as disclosed herein removes that possibility by printing that card and pin number on the card inside the kiosk at the point of purchase and at the time of purchase.

Fraudsters that make multiple visits in a single day to circumvent daily limits on gift card purchases. The disclosed principles' proprietary "Encompass Retail Software" monitors all transactions through suppliers in the kiosk and stops the same credit card from being used multiple times at any location. The same situation can be prevented where fraudsters use cash instead of a credit card, such as by requesting and storing a user's driver's license and/or credit card or similar payment vehicle.

Fraudsters that buy open-loop or closed-loop gift cards with a physical stolen credit card. A system or kiosk as disclosed herein may be configured to request zip codes for gift card purchases over a certain dollar amount and/or a driver's license for gift card purchases over a certain amount.

A fraudster conducts a gift card exchange, but the fraudster takes a picture or copies down the gift card number and pin. Immediately after an exchange transaction at a disclosed kiosk is completed, the fraudster goes to that brand's website and spends that value because only the card number and pin are required for online purchases (i.e., the physical card is not needed). A disclosed kiosk mitigates this risk by putting the customer through a process requiring a personal, verifiable identification of the user, such as via a driver's license and credit card of the user.

In conventional systems providing existing gift card exchanges, payouts come out of the conventional system in the form of a voucher with a barcode that is then taken to the retailer and exchanged for cash. Fraudsters have found ways to reengineer the barcode on such a voucher so as to alter the amounts to much larger amounts that the actual exchange amounts. A system or kiosk as disclosed herein mitigates this by managing the transaction entirely within the kiosk, from receiving the prior gift cards being exchanged, verifying identification of the user, and providing a secure payout medium ready for use. This way, no voucher or interaction is needed from the retailer to complete the gift card exchange or purchase.

Consumer Customer Services

According to a preferred exemplary embodiment, the kiosk may provide connectivity with a "live" communication for post purchase, post issue follow up with a live interface portal (LIP) (0218). The LIP (0218) may be an audio device such as a microphone or a video device such as a camera. The LIP (0218) may enable a consumer (0201) to communicate with a live customer support (0290) via GMS (0230) and network (0240). Alternately, a consumer may perform an online chat on the KPI (0211) with a touch screen or typing with a keyboard. The consumer may also request support before a transaction, during a transaction, or after a transaction.

Preferred Exemplary Kiosk Processor Interface
(0300-0400)

Figure 3:
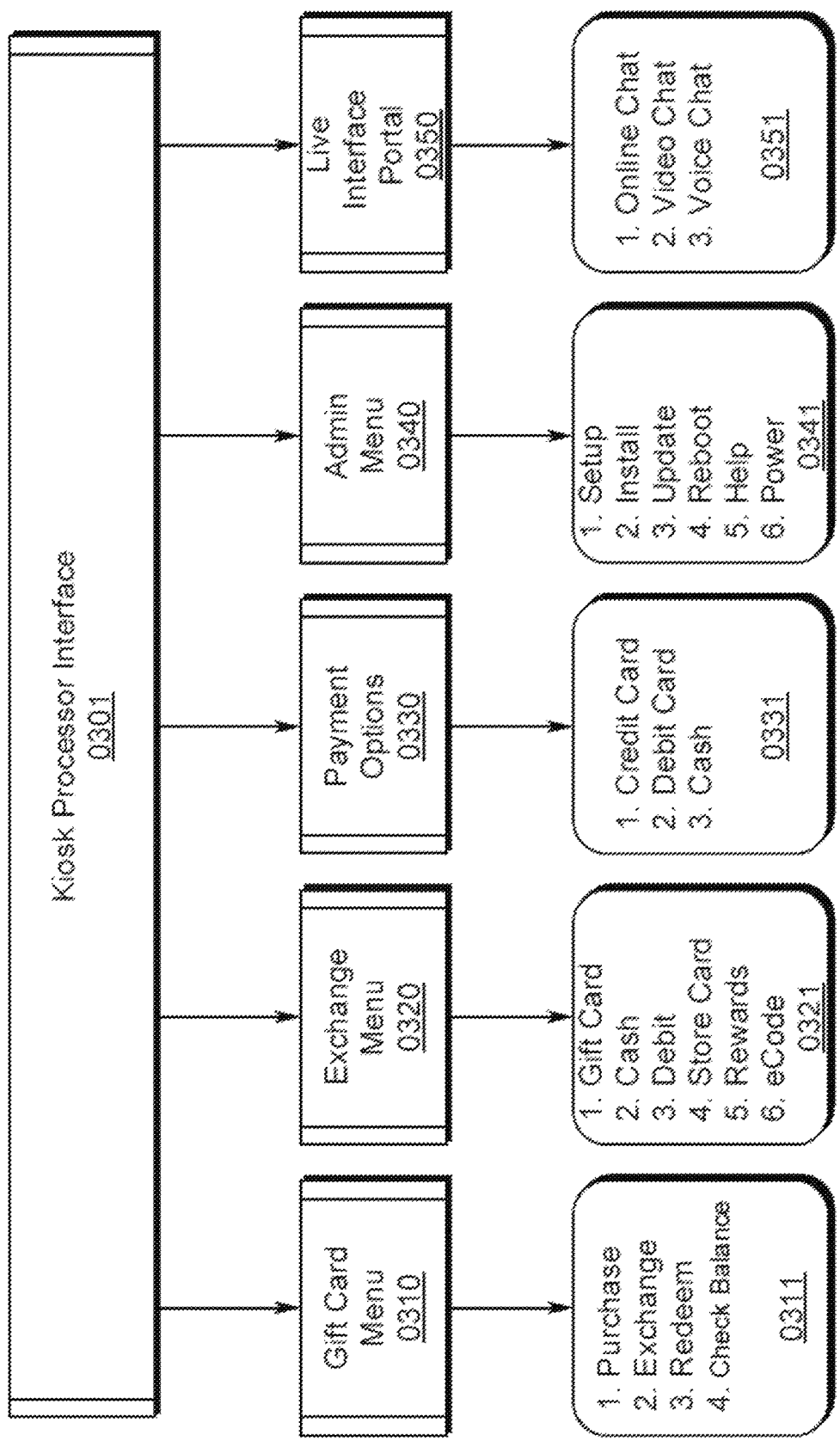
FIG. 3 illustrates a detailed kiosk processor interface system according to a preferred embodiment of the present invention.
Figure 4:
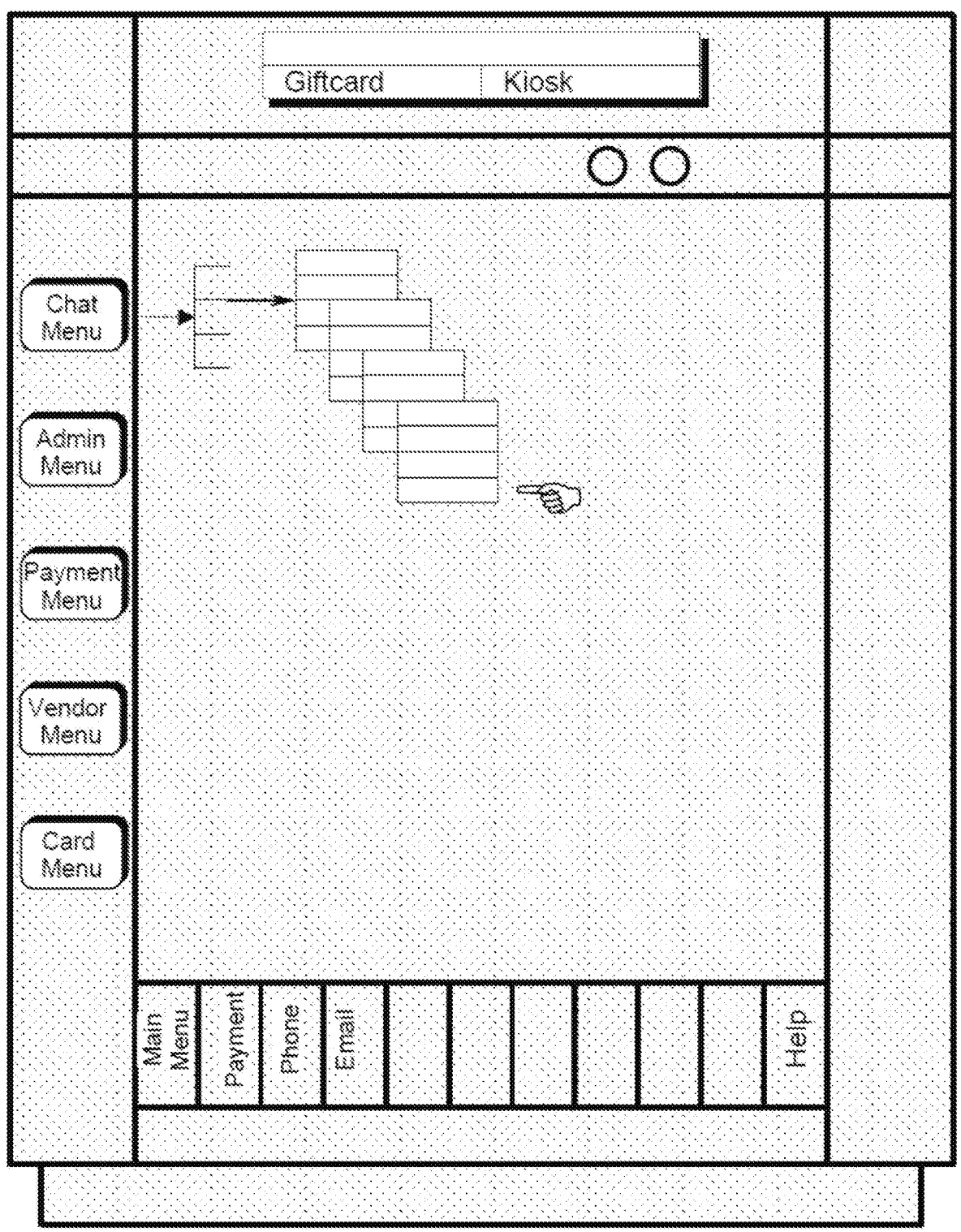
FIG. 4 illustrates a detailed kiosk processor interface display according to a preferred embodiment of the present invention.

As generally illustrated in FIG. 3 (0300) and FIG. 4 (0400), an exemplary kiosk processor interface (0301) comprises a gift card menu (0310) for purchasing/exchanging, a gift card exchange/redeeming menu (0320), a payment option menu (0330), an administrator menu (0340), and a chat menu (0350). A user may interface with a kiosk via the KPI (0301) and navigate through the menus with a touch interface or a graphical interface in the same manner for both physical kiosks and virtual kiosks. The user may select an exchange menu (0320) to exchange unused gift cards that may or may not have a balance on them. The user may exchange for another gift card from a different vendor (i.e., a "closed loop" gift card), a gift card useable at any of a variety of locations (i.e., an "open loop" git card") such as one issued under the MasterCard® or VISA® networks, cash, check, bank debit, store credit/gift card, and/or an eCode for use with online purchases (0321). Moreover, such consolidation of existing gift cards or other values takes only mere seconds, e.g., 25 seconds, versus the 15-20 minute or longer process conventional exchange options could offer consumers.

As discussed throughout this disclosure, when the term gift card is used, it is understood that the gift card may be administered via more than simply a physical payment card, and thus the term "gift card" herein includes digital/virtual gift cards or electronic or "e-gift cards". As a result, the issuance of a closed or open loop gift card, or store credit in the form of a store gift card, could be issued in a physical card or as a digital gift card or e-gift card. In some embodiments, the gift card may be administered via such an eCode, which can comprise an electronic/digital gift card, either entered manually or provided via another payment vehicle such as a mobile phone payment application. For example, such a payment application is sometimes encompassed as an "e-wallet" and provides the consumer with safe and secure methods to hold all forms of e-commerce currency. Another digital feature provided by a kiosk in accordance with the disclosed principles is the ability to exchange cryptocurrency into cash or into a gift card, such as an open loop gift card, at the kiosk.

In one embodiment, a proprietary e-wallet may be provided via a disclosed kiosk for storing any type of digital value or currency. This would include, but is not limited to, open and closed loop gift cards, digital exchange, cryptocurrency, e-credit cards and e-debit cards. Such an e-wallet could tie directly to retailers and banking backend systems via the retailer/banking application, and offers both retail partners and consumers the ability to engage with one-to-one direct sale or personalization options supporting promotions and deliverables in a noninvasive method. In other words, no emails or text, the purchase could be just direct to the e-wallet or any payment application. Then the card information is ready in the e-wallet when the customer wants to make a purchase. Another key feature of such a proprietary e-wallet includes organization, which allows the owner to program alert dates on their mobile devices for special occasions, birthdays, and other personalized reminders.

An additional feature available via the KPI (0301) and kiosk as disclosed herein is the activation of purchased physical gift cards. In an exemplary embodiment, the KPI (0301) provides an on-demand service that allows pre-printed gift cards to be scanned, paid for, and activated at the kiosk. This is also possible via a virtual kiosk accessed by the consumer, which instead of scanning the pre-printed gift card would instead require the consumer to enter the gift card information to the virtual kiosk interface.

The consumer picks an existing pre-printed gift card from a rack in-store. In a more specific embodiment, the KPI (0301) may display an "Activate My Gift Card" on the screen, which when selected prompts the consumer to scan the back of the gift card and then asks what denomination they would like to put on the selected gift card, or to select from a list of preset denominations. The consumer makes payment which activates the gift card and a receipt can be provided, all in 30 seconds or less. To accomplish the activation, the KPI (0301) may communicate with a gift card management server associated with vendor providing the gift card being activated, across a computer communications network, associated with the particular gift card being activated.

In some embodiments, once activated the KPI (0301) can be configured to present the option to the consumer to convert the activated git card to a digital or electronic gift card. Additionally, the KPI (0301) may provide an option to a consumer to store the converted electronic gift card to a payment application, such as an e-wallet of the consumer. Still further, the KPI (0301) may be configured to provide an option to a consumer to transmit the electronic gift card to a desired recipient. In such embodiments, the consumer could provide unique contact information of the intended recipient, and then the e-gift card is transmitted and may be stored in a payment application associated with the intended recipient.

An administrator may login to the KPI (0301) via the admin menu (0340) and perform administrator actions such as set up, update, reboot, and/or install new features (0341). The user may be provided with payment options such as credit card, debit card, and/or cash (0331). The user may select a gift card menu (0310) to access options such as gift card purchase, gift card reload, gift card exchange, gift card redeem or gift card balance check (0311). The user may also request support from customer support (0290) through a live interface portal. The user may choose one of the chat options (0351) from online chat, video chat and voice chat.

Preferred Exemplary Flowchart Kiosk Gift Card Purchase Method (0500)

Figure 5:
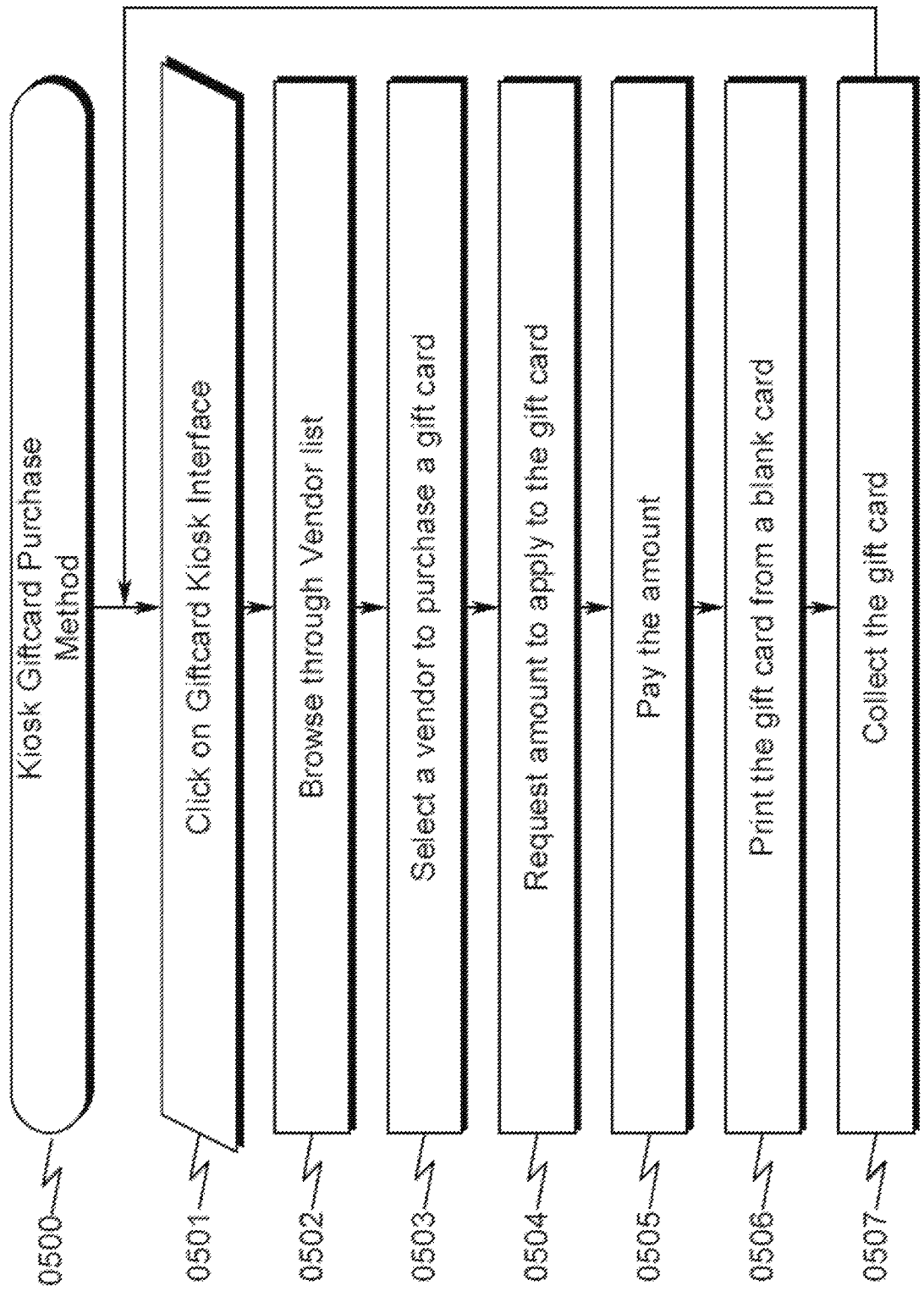
FIG. 5 illustrates a flowchart describing an exemplary kiosk gift card purchase according to a preferred embodiment of the present invention.

As generally seen in the flow chart of FIG. 5 (0500), a preferred exemplary Kiosk Gift Card Purchase method may be generally described in terms of the following steps:

(1) clicking on the kiosk processor interface (0501);
   A user may click through or touch the KPI to navigate the different options of the interface as aforementioned in FIG. 3 (0300) and FIG. 4 (0400).

(2) browsing through a list of vendors (0502);
   The user may browse through a list of vendors that are stored and maintained in a vendor database that is accessible by a gift card management server via a network. An administrator may add/delete/update vendors in the vendor database. In addition, the user may insert, or scan with a card reader, a prior-purchased used gift card for reloading with funds. In such case, after inserting the gift card into the kiosk, the kiosk's processor can simply identify the vendor of the gift card from among the available list of vendors available through the kiosk.

(3) selecting a vendor to purchase a gift card from the vendor (0503);
   The user may select a vendor from the list of vendors. In embodiments with a previously purchased gift card, the user may simply confirm the vendor identified by the kiosk. Alternatively, if the kiosk is not able to identify the vendor of an inserted previously purchased gift card, the user may then be given the option to select the appropriate vendor the user would like to use for the prior gift card.

(4) requesting a monetary amount to apply to the gift card (0504);
   The user may request an amount to be applied to the gift card. The request may then be forwarded to GMS for processing. The GMS may connect with the vendor of interest to vendor management server (VMS) via network and receive a confirmation to print the gift card.

(5) paying the monetary amount (0505);
   The user may pay with a credit card or debit card for the requested amount with a card reader. The user may also choose to pay in cash. The card reader may communicate via network with a payment server that authenticates the payment and sends a confirmation for the payment.

(6) printing and dispensing the gift card (0506); and
   The GMS may then instruct a gift card printer to print the gift card with a personalized message and dispense the gift card via a gift card dispenser, print the gift card at a second kiosk or other authorized location, or transmit the gift card as a digital/virtual gift card electronically to the user.

(7) collecting the gift card (0507).
   The user may then collect the gift card from the gift card dispenser, the authorized location, or virtually, such as via email, text, an eCode, or in the user's mobile eWallet.

Preferred Exemplary Flowchart Kiosk Gift Card Exchange Method (0600)

Figure 6:
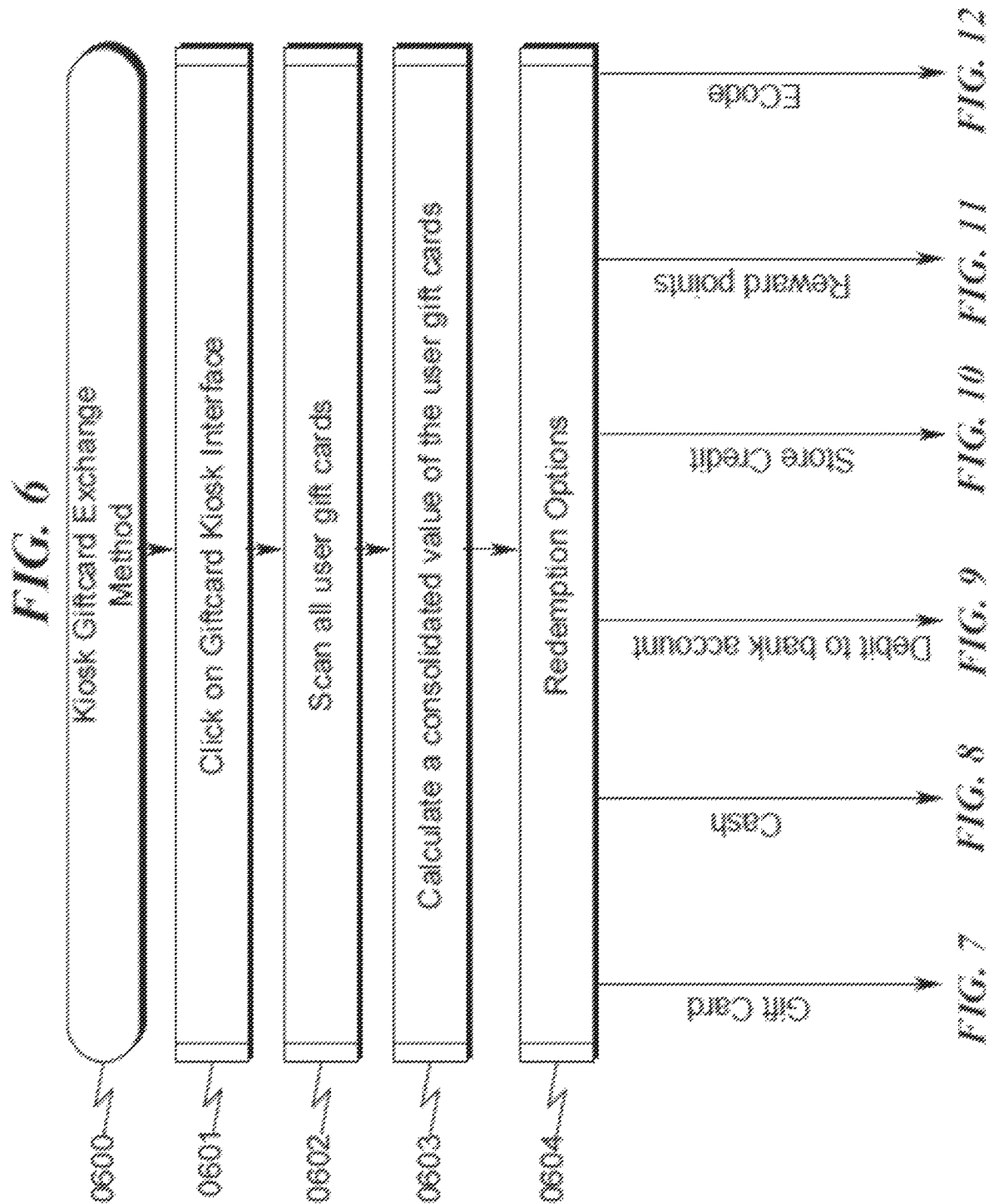
FIG. 6 illustrates a flowchart describing an exemplary kiosk gift card exchange/redeeming according to a preferred embodiment of the present invention.

As generally seen in the flow chart of FIG. 6 (0600), a preferred exemplary Kiosk Gift Card Exchange method may be generally described in terms of the following steps:

(1) clicking on the kiosk processor interface (0601);
   A user may click through or touch the KPI to navigate the different options of the interface as aforementioned in FIG. 3 (0300) and FIG. 4 (0400).

(2) scanning user gift cards with a card reader (0602), or otherwise entering the gift cards' information;
   The user may insert or use a card reader to scan user gift cards that are unused or have a balance remaining on them. Or a user may simply enter the gift card information, whether at a physical kiosk or a virtual kiosk. A unique identification number (UID) associated with each gift card may be saved in a local database maintained by the GMS. The card collector at a physical kiosk may collect the cards and unused cards may be recycled or reused for future customized gift cards.

(3) calculating a consolidated value for remaining balance of the user gift cards (0603); and The gift card management server may add the remaining balances on all the user gift cards and determine a consolidated value. The GMS may communicate with plural vendors via the vendor management server with the UID's to determine remaining balance on each cards. For example, gift card 1 may have an unused value of $34, gift card 1 may have an unused value of $46 and gift card 1 may have an unused value of $100. The GMS will determine a consolidated value of $180 for the unused gift cards.

(4) providing redeeming options for exchanging said user gift cards to the users (0604).

The KPI may provide various exchange options for the consolidated value such as another gift card from a different vendor, cash, check, bank debit, store credit, and/or an eCode for use with online purchases.

Preferred Exemplary Flowchart Kiosk Gift
Card-Gift Card Exchange Method (0700)

Figure 7:
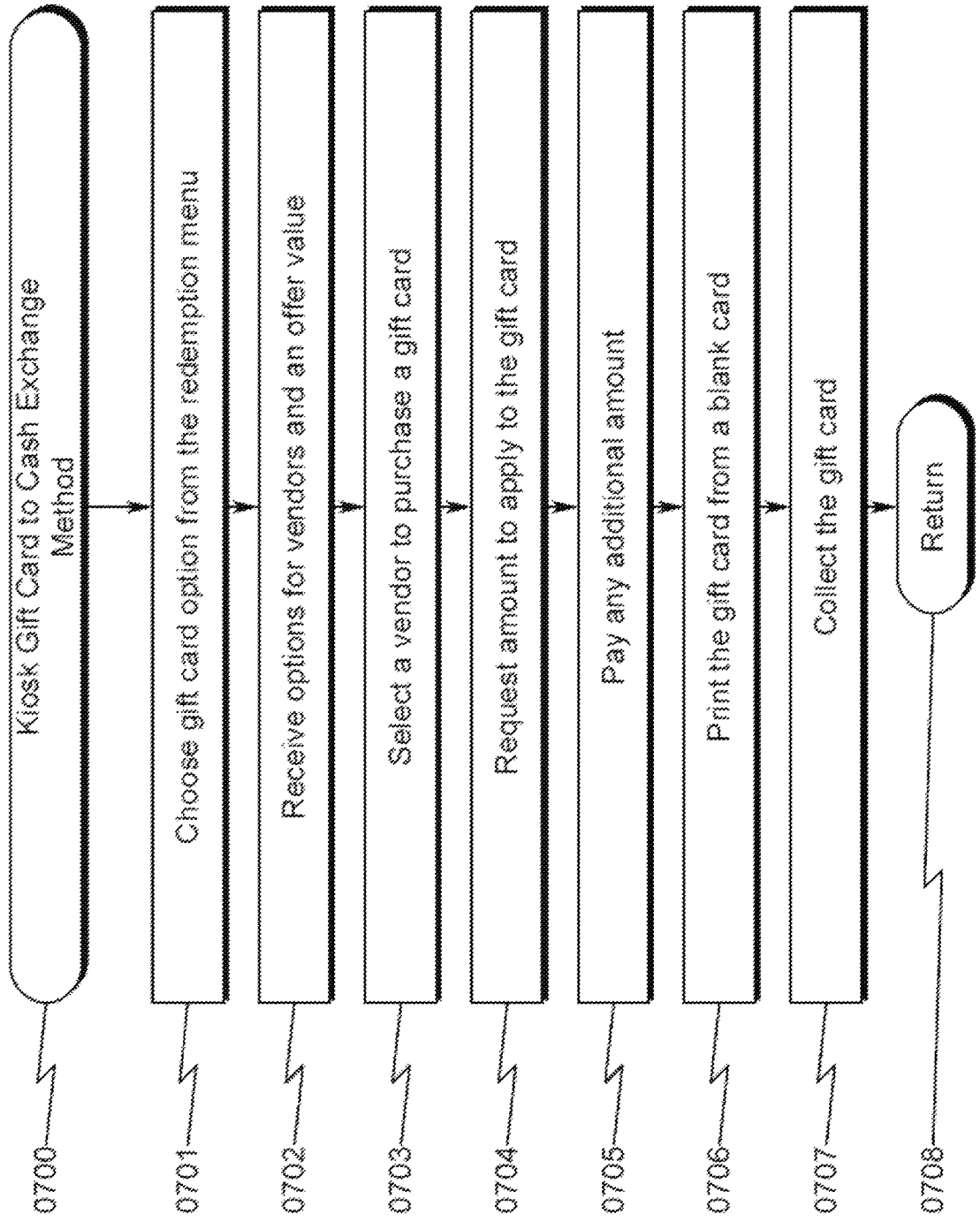
FIG. 7 illustrates a flowchart describing an exemplary kiosk gift card to gift card exchange option according to a preferred embodiment of the present invention.

As generally seen in the flow chart of FIG. 7 (0700), a preferred exemplary Kiosk Gift Card to Gift Card Exchange method may be generally described in terms of the following steps:

(1) choosing gift card option from a redeeming menu on the kiosk processor interface (0701);

(2) receiving plural vendor options and a discounted offer in exchange for the consolidated value (0702);

The GMS may provide the user with a list of available vendors to choose from along with a discounted offer value in exchange for the consolidated value. For example, the GMS may offer a $100 worth Home Depot Card for a consolidated value of $180.

(3) selecting a vendor from said options for a new vendor gift card (0703);

If the user accepts the offer value, the user may select a vendor from the list of vendors.

(4) requesting a monetary amount to apply to the vendor gift card (0704);

The user may request a monetary value to apply to the selected vendor gift card. For example, the user may request to apply $110 to the gift card.

(5) paying any additional monetary amount above the offer value (0705);

The user may pay the $10 difference from the step above to apply to the gift card.

(6) printing and dispensing said gift card from a blank card, or digitally transmitting a virtual gift card or eCode to the user, applying the monetary amount (0706), or, optionally, reloading a previously purchased gift card with the accepted value; and (7) collecting the gift card (0707) or virtual gift card.

Preferred Exemplary Flowchart Kiosk Gift
Card-Cash Exchange Method (0800)

Figure 8:
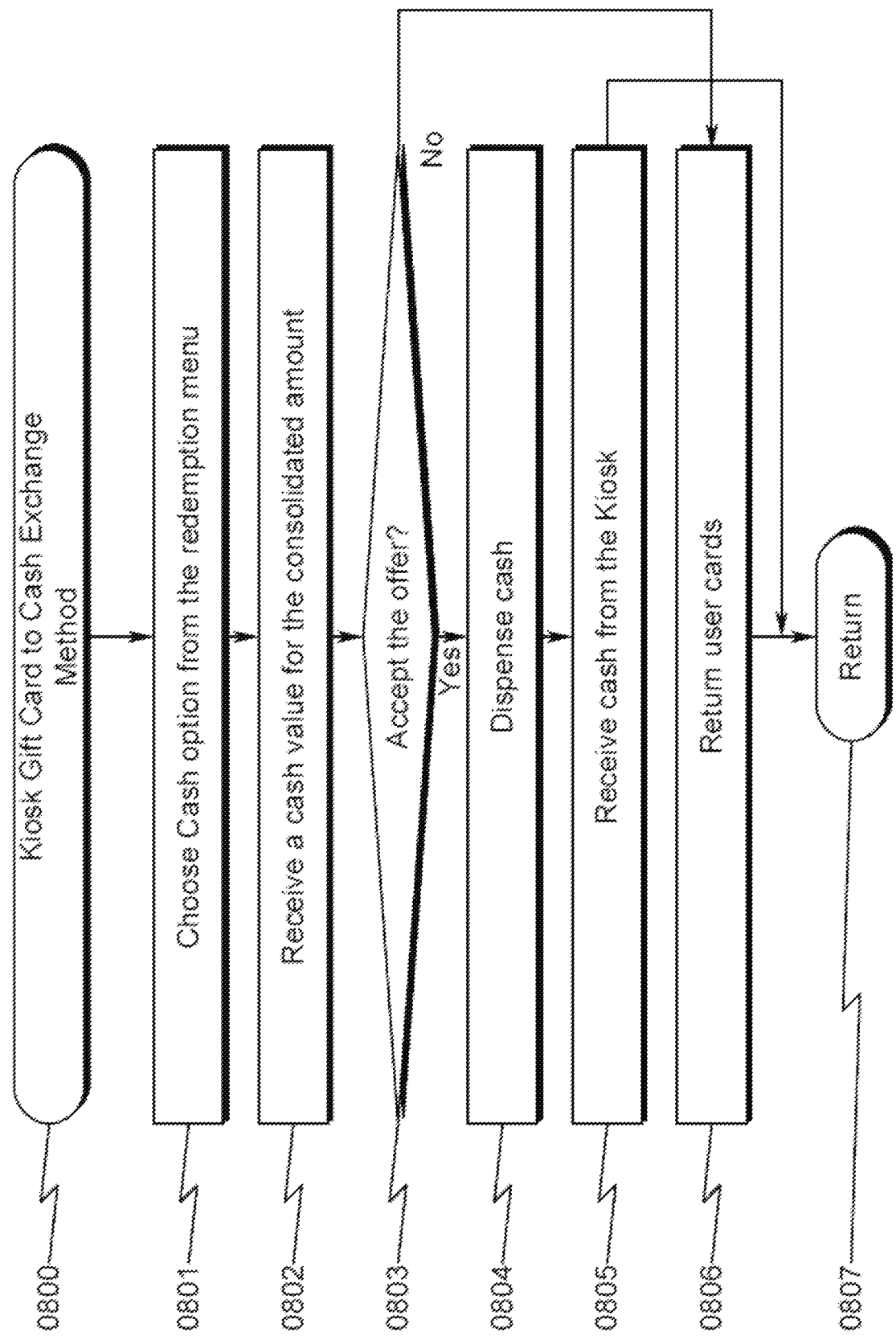
FIG. 8 illustrates a flowchart describing an exemplary kiosk gift card to cash exchange method option according to a preferred embodiment of the present invention.

As generally seen in the flow chart of FIG. 8 (0800), a preferred exemplary Kiosk Gift Card to Cash Exchange method may be generally described in terms of the following steps:

(1) choosing cash option from a redeeming menu on the kiosk processor interface (0801);

(2) receiving a discounted offer in exchange for the consolidated value (0802);

(3) accepting the offer value, if not, proceeding to step (0806) (0803);

(4) dispensing cash or otherwise providing digital payment to the user for the offer value (0804);

(5) collecting cash from the dispenser (0805) or receiving the digital payment electronically; and (6) returning the user gift cards (0806) if at a physical kiosk.

Preferred Exemplary Flowchart Kiosk Gift
Card-Bank Debit Exchange Method (0900)

Figure 9:
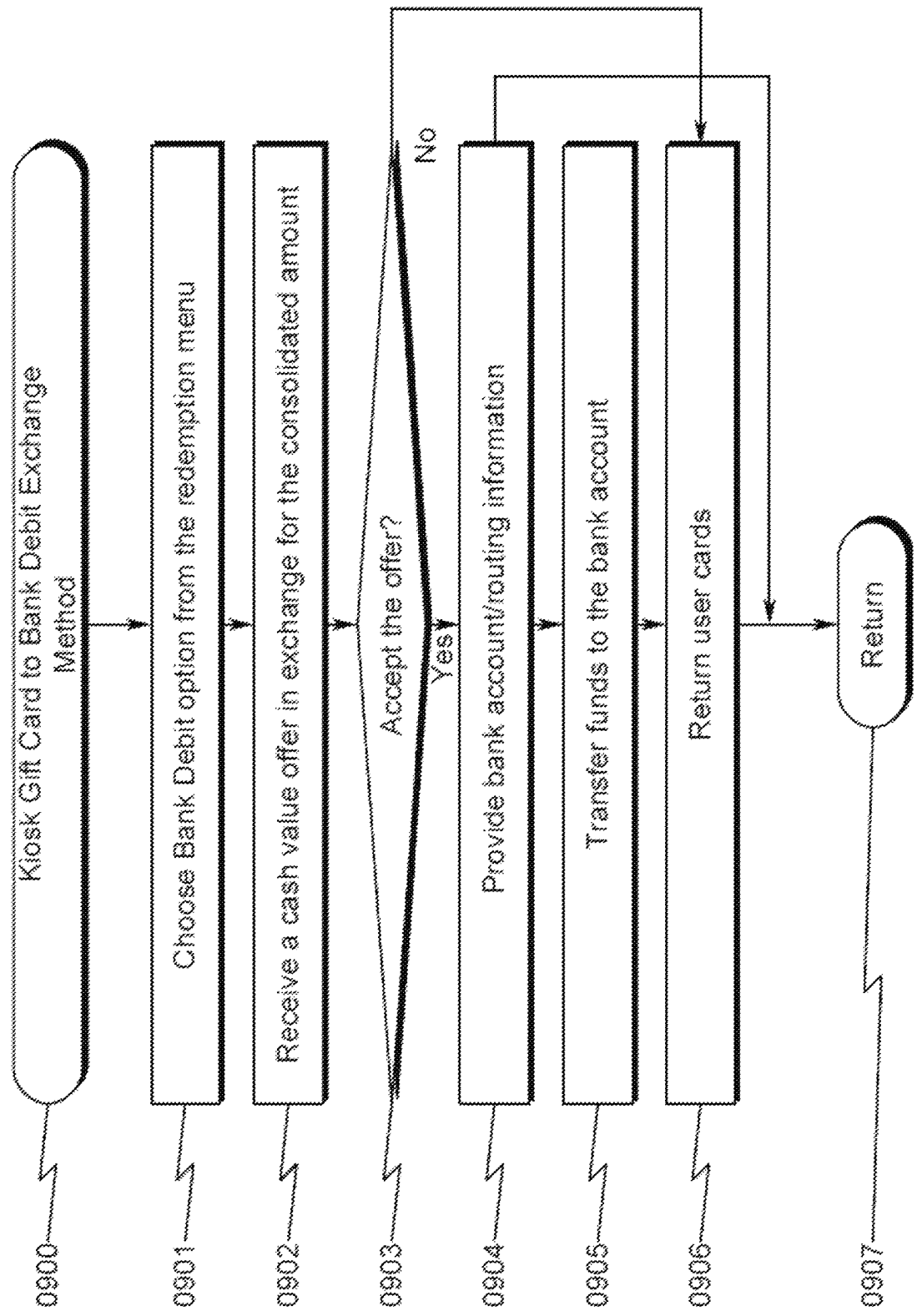
FIG. 9 illustrates a flowchart describing an exemplary kiosk gift card to bank debit exchange method option according to a preferred embodiment of the present invention.

As generally seen in the flow chart of FIG. 9 (0900), a preferred exemplary Kiosk Gift Card to Bank Debit Exchange method may be generally described in terms of the following steps:

(1) choosing bank debit option from a redeeming menu on the kiosk processor interface (0901);

(2) receiving a discounted offer for the consolidated value (0902);

(3) accepting the offer value, if not, proceeding to step (0906) (0903);

(4) providing bank account information (0904);

(5) transferring funds for the offer value to the bank information (0905); and (6) returning the user gift cards (0906) if at a physical kiosk.

Preferred Exemplary Flowchart Kiosk Gift
Card-Store Credit Exchange Method (1000)

Figure 10:
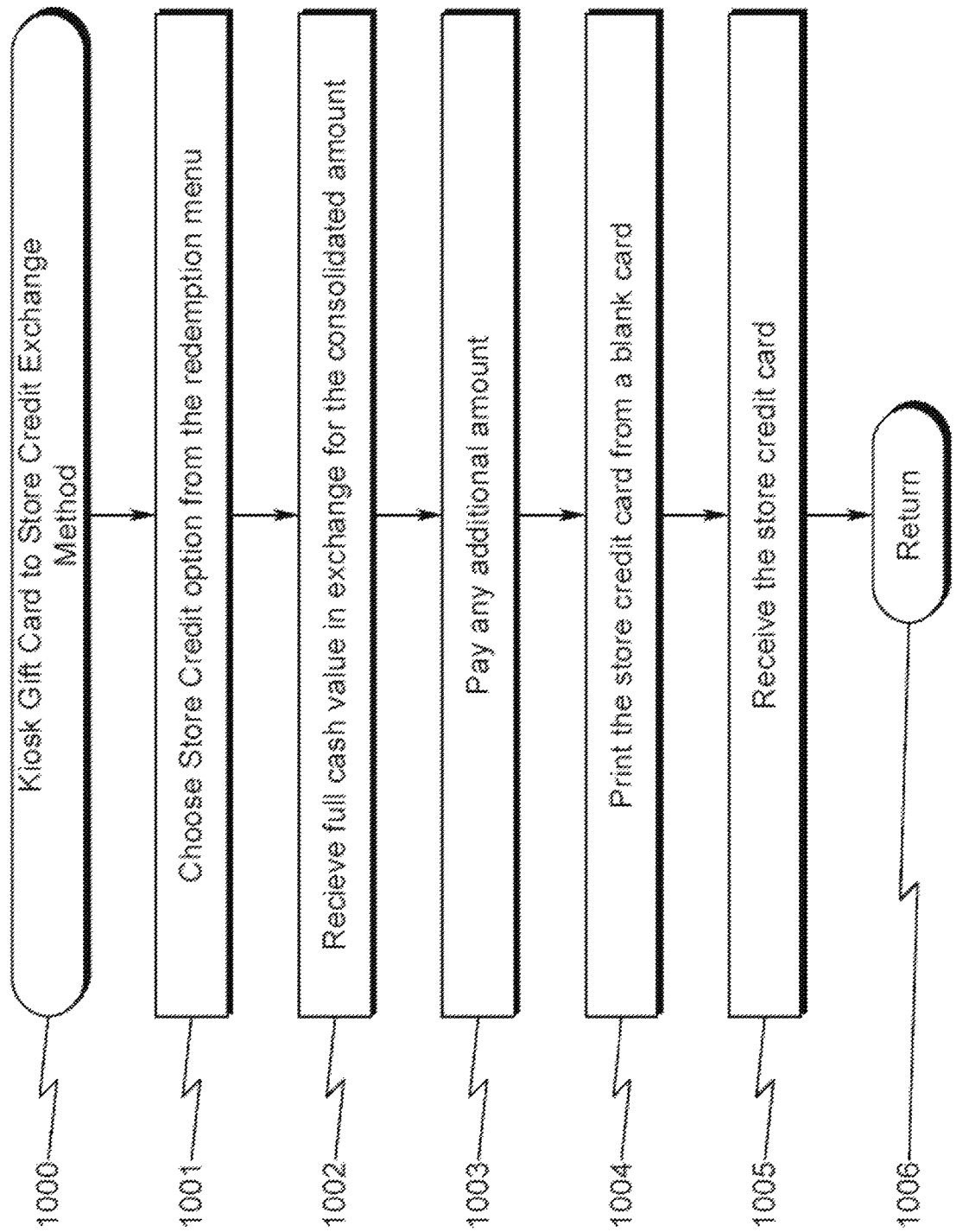
FIG. 10 illustrates a flowchart describing an exemplary kiosk gift card to store credit exchange method option according to a preferred embodiment of the present invention.

As generally seen in the flow chart of FIG. 10 (1000), a preferred exemplary Kiosk Gift Card to Store Credit Exchange method may be generally described in terms of the following steps:

(1) choosing store credit option from a redeeming menu on the kiosk processor interface (1001);

(2) receiving a full value offer in exchange for the consolidated value (1002);

(3) paying any additional monetary amount above the offer value (1003);

(4) printing and dispensing said store card for the retail establishment from a blank card applying the monetary amount (1004); and (5) collecting the store card (1005) if at a physical kiosk.

Preferred Exemplary Flowchart Kiosk Gift
Card-Rewards Points Exchange Method (11001

Figure 11:
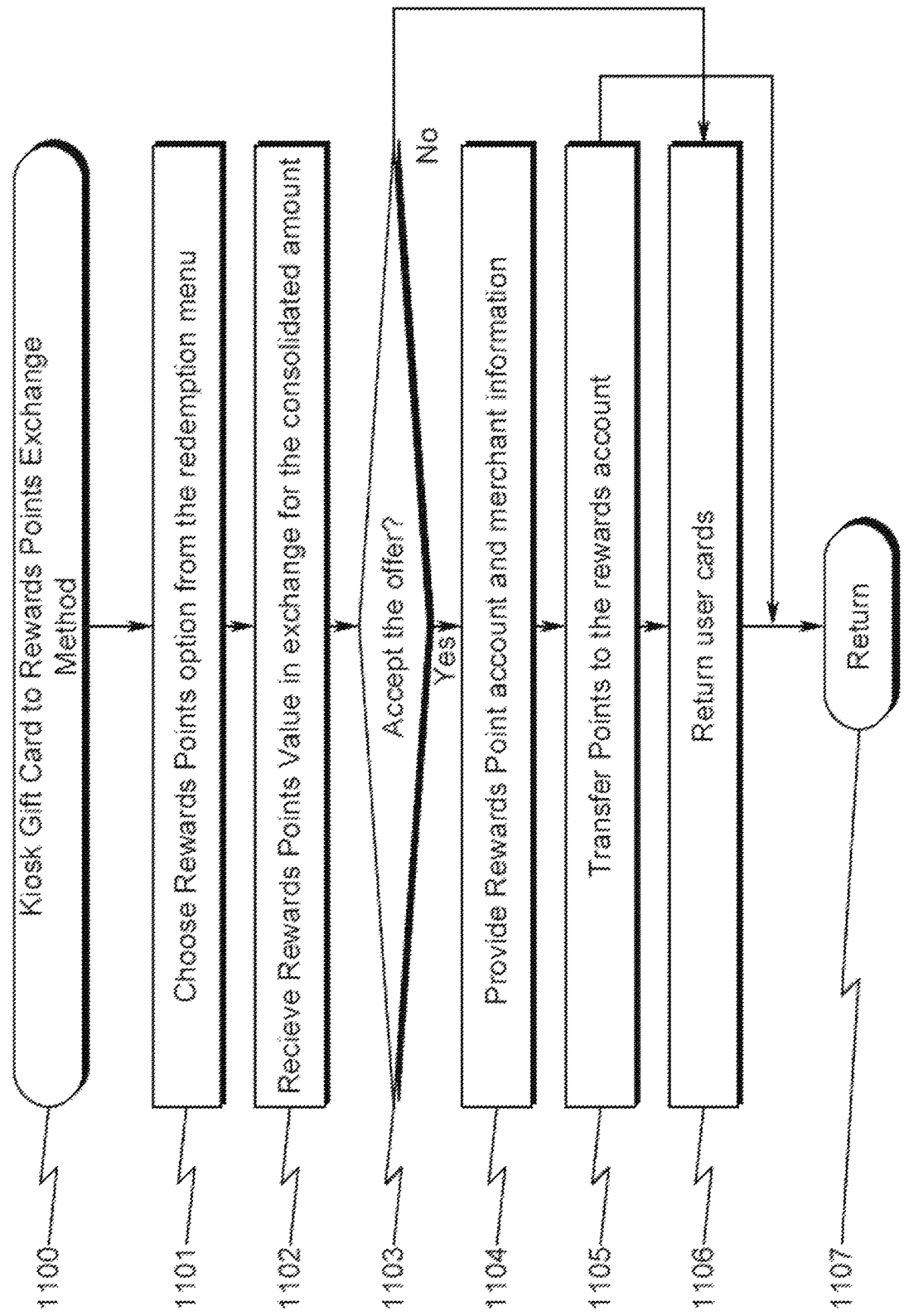
FIG. 11 illustrates a flowchart describing an exemplary kiosk gift card to rewards points exchange method option according to a preferred embodiment of the present invention.

As generally seen in the flow chart of FIG. 11 (1100), a preferred exemplary Kiosk Gift Card to rewards points Exchange method may be generally described in terms of the following steps:

(1) choosing rewards points option from a redeeming menu on the kiosk processor interface (1101);

(2) receiving rewards points in exchange for the consolidated value (1102);

(3) accepting the rewards points, if not, proceeding to step (1106) (1103);

(4) providing rewards account information (1104);

(5) transferring the rewards points to the rewards account (1105); and (6) returning the user gift cards (1106) if at a physical kiosk.

Preferred Exemplary Flowchart Kiosk Gift Card-eCode Exchange Method (1200)

Figure 12:
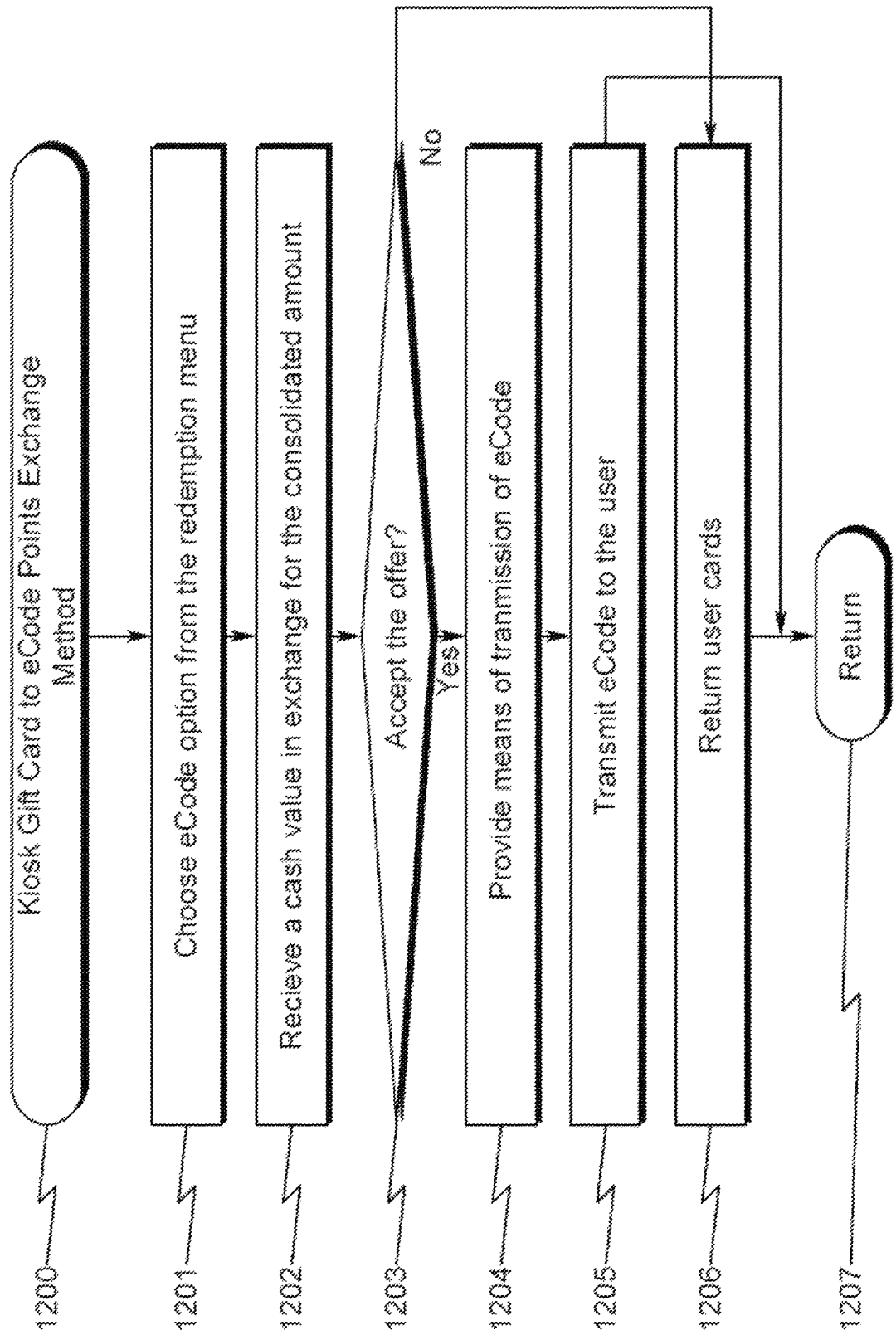
FIG. 12 illustrates a flowchart describing an exemplary kiosk gift card to eCode exchange method option according to a preferred embodiment of the present invention.

As generally seen in the flow chart of FIG. 12 (1200), a preferred exemplary Kiosk Gift Card to rewards points Exchange method may be generally described in terms of the following steps:
(1) choosing eCode option from a redeeming menu on the kiosk processor interface (1201);
(2) receiving a discounted offer in exchange for the consolidated value (1202);
(3) accepting the offer value, if not, proceeding to step (1206) (1203);
(4) providing means for transmitting an eCode to the user (1204);
(5) transmitting the eCode to the user (1205); and
(6) returning the user gift cards (1206) if at a physical kiosk.

Preferred Exemplary Gift Card Value Check System (1300)

Figure 13:
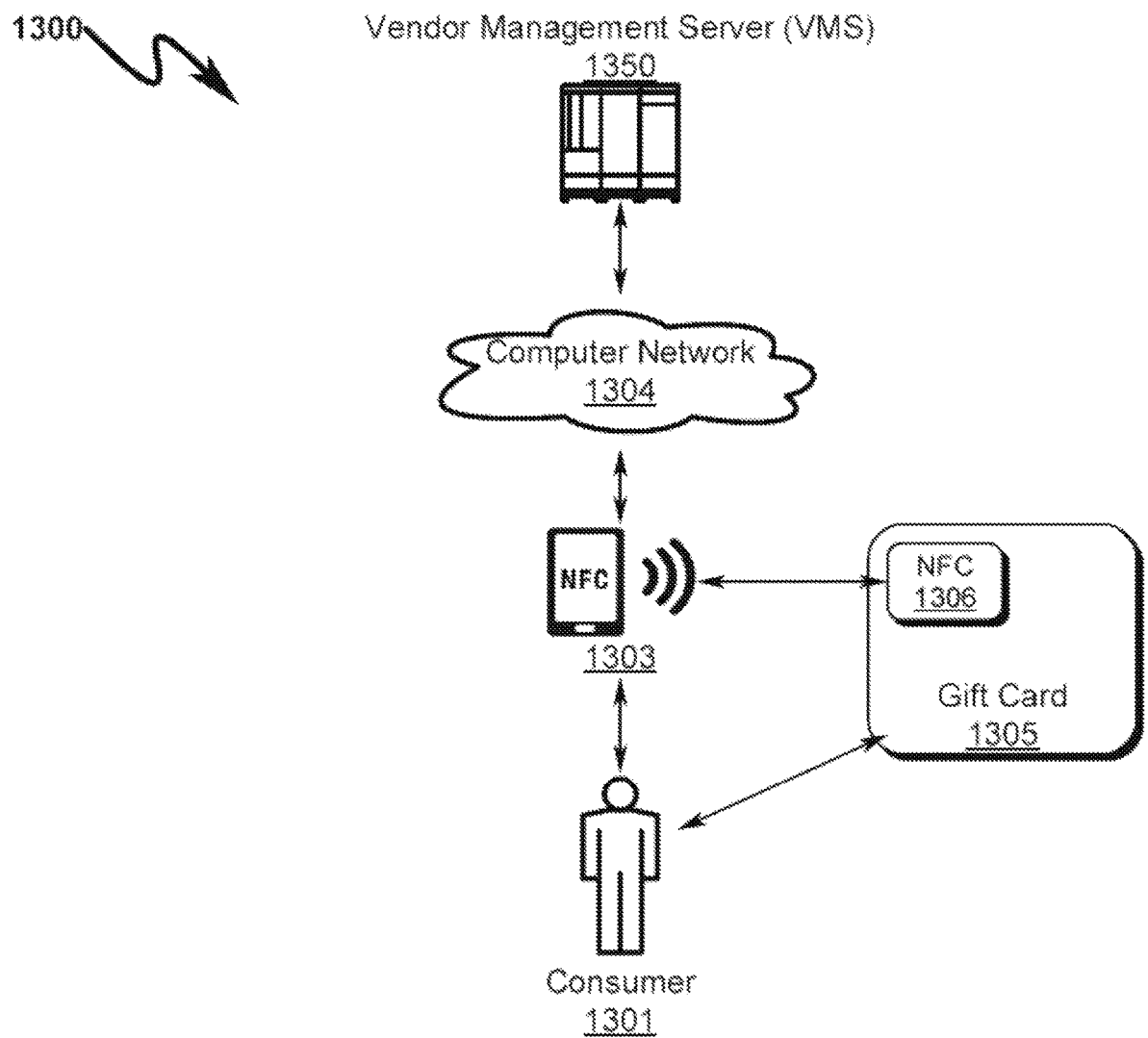
FIG. 13 illustrates a gift card value check system according to a preferred embodiment of the present invention.

The present invention may be seen in more detail as generally illustrated in FIG. 13 (1300), wherein a user/consumer (1301) with a NFC reader equipped mobile computing device (1303) checks value of a gift card (1305). The gift card (1305) may also be embedded with a NFC compatible chip (1306) that communicates wirelessly with device (1303). The consumer (1301) may query the balance of a gift card (1305) with an application on the device (1303). The mobile device (1303) may then query a vendor management server (VMS) (1350) via a network (1304). The VMS (1350) may be remotely located so that it may be accessible via the network (1304). An administrator may remotely monitor VMS (1350) via the network (1304). The network may be wired and may use protocols such as Ethernet. The network may be wireless and may use protocols such as 4G, LTE, and/or Bluetooth. When queried by the device (1303) with a gift card identification number (Gift card ID), the VMS (1350) may respond with a balance on the gift card. The mobile device (1303) may then display the gift card balance to the consumer (1301).

Preferred Exemplary Gift Card Value Check Method (1400)

Figure 14:
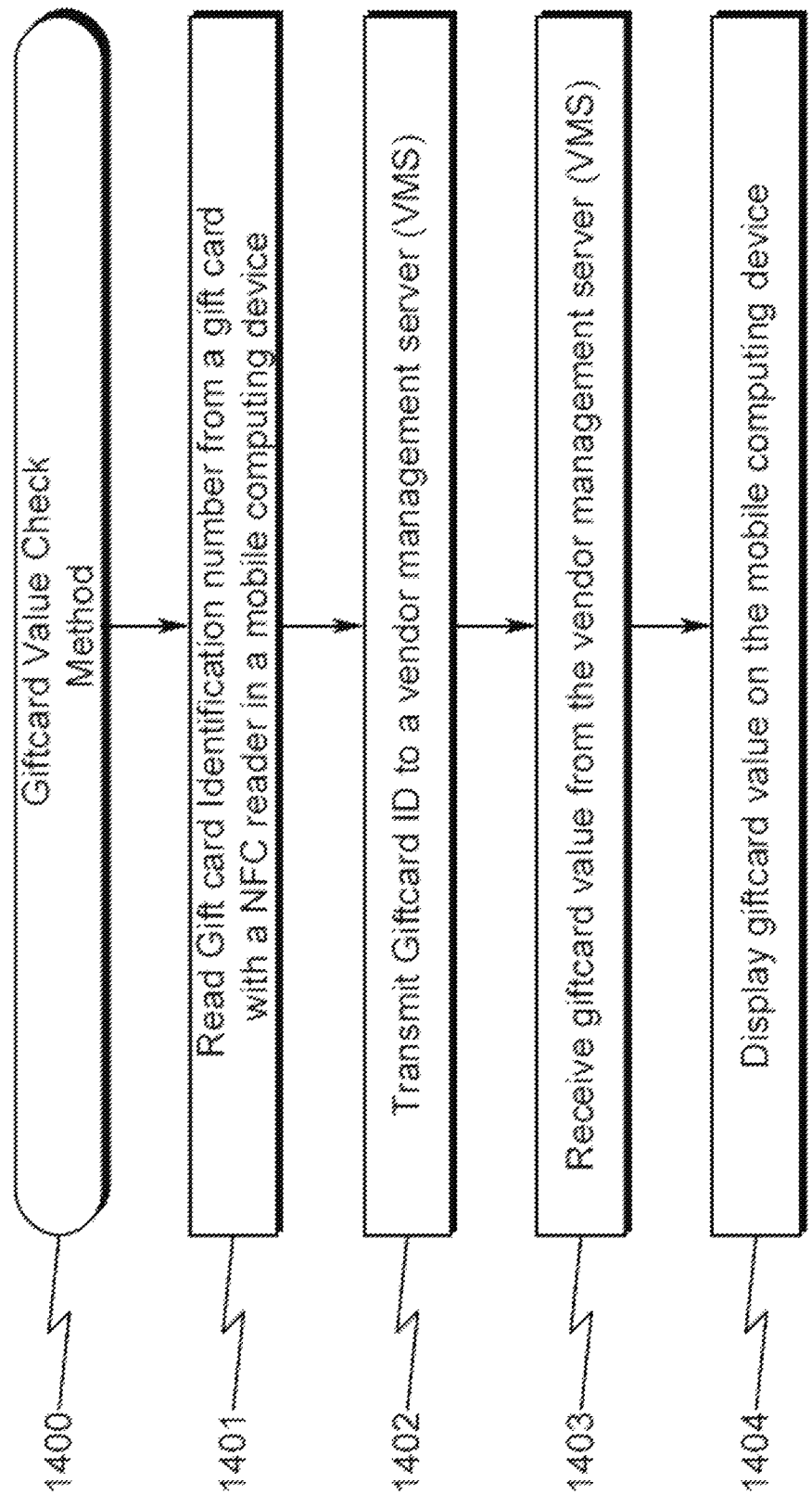
FIG. 14 illustrates a flowchart describing a gift card value check method according to a preferred embodiment of the present invention.

As generally illustrated in FIG. 14 (1400), the present invention system may be utilized in the context of an overall gift card balance/value check method, wherein the gift card value check system as described previously in FIG. 13 (1300) is controlled by a method having the following steps:
(1) reading gift card identification (ID) number from a gift card with a NFC reader in a mobile computing device, or receiving the gift card ID from the user at a virtual kiosk (1401);
(2) transmitting the gift card ID to a vendor management server (1402);
(3) receiving gift card balance from the vendor management server (1403); and
(4) displaying the gift card balance on the mobile computing device or virtual kiosk interface (1404).

Preferred Exemplary Remote Kiosk Gift Card Presentation System (1500)

Figure 15:
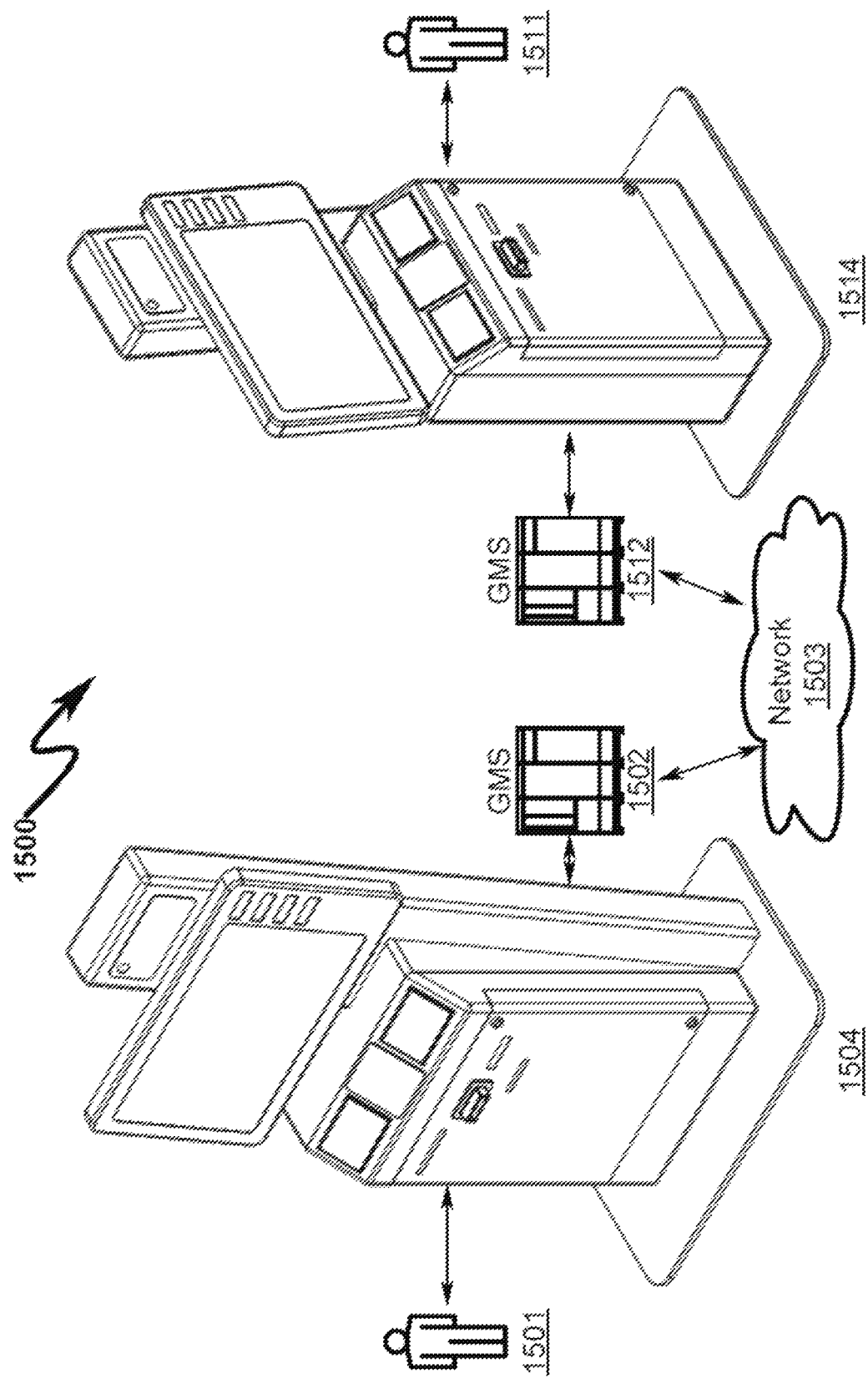
FIG. 15 illustrates an exemplary remote kiosk gift card presentation system according to a preferred embodiment of the present invention.

The present invention may be seen in more detail as generally illustrated in FIG. 15 (1500), wherein a kiosk gift card system comprises a kiosk (1504) with a gift card dispenser, a live interface portal (LIP), and a kiosk processor interface that communicates with a gift card management server (1502). The kiosk processor interface may be a touch user interface that is based upon the sense of touch or a graphical user interface (GUI) that may be navigated with a pointing device such as a mouse. A user (1501) may use the touch interface to interact and navigate the kiosk (1504). The kiosk (1504) may communicate with another remote kiosk (1514) located at a different retail establishment. The retail establishment may be located in the same place or in a different location or place.

According to a preferred exemplary embodiment, a user may purchase a gift card at a kiosk with the kiosk processor interface and print the gift card at a remote kiosk that could be collected at the remote retail establishment. Similarly, the user may purchase funds for a gift card at the first location, and then those purchased funds may be loaded onto a previously purchased gift card at the second location. The kiosk (1504) may communicate with kiosk (1514) via a network (1503) through gift card management system (1502) and gift card management system (1512).

According to yet another preferred exemplary embodiment, a user may redeem unused gift cards at a kiosk with the kiosk processor interface, accept an offered monetary value from the kiosk, and print the gift card at a remote kiosk that could be collected at the remote retail establishment.

According to a further preferred exemplary embodiment, a user (1501) may purchase a gift card at a kiosk (1504) with the kiosk processor interface, receive an electronic code (eCode) from the kiosk (1504), and transmit the eCode to another user (1511) located at another location. The user (1511) may then print a customized gift card at a remote kiosk (1514). The eCode may be scrambled, encrypted, and/or encoded for security purposes.

In all of the above-described embodiments, the kiosk (1504) may be embodied in a virtual kiosk, where the interface to the virtual kiosk platform or system permits all of the above functionality, but without certain physical components employed in physical kiosks, such as touch interface at physical kiosk which would be replaced with an interactive interface or GUI of the virtual kiosk.

Preferred Exemplary Flowchart Remote Kiosk Gift Card Presentation Method (1600)

As generally illustrated in FIG. 16 (1600), the present invention system may be utilized in the context of an overall remote kiosk gift card presentation method, wherein the remote kiosk gift card presentation system as described previously in FIG. 15 (1500) is controlled by a method having the following steps:
(1) paying cash or redeeming unused gift cards (gift cards with a balance) choosing eCode option from a redemption menu on a kiosk processor interface (1601);
(2) receiving a discounted cash offer value in exchange for the consolidated value of the unused gift cards (1602);
(3) accepting the offer value and selecting an eCode or eCode option, if not, proceeding to step (1609) (1603);
(4) providing means for transmitting an eCode to the user, if eCode is selected (1604);
(5) transmitting the eCode to a remote user (1605);
(6) purchasing gift cards with said eCode at a second gift card kiosk located in a second location (1606);
(7) printing a gift card at a remote kiosk in a different (second) location in a retail establishment, if remote printing is selected in step (1603) (1607);

(8) collecting the printed gift card at the remote kiosk by a second user (1608);

(9) returning the user gift cards (1609).

Anywhere Use Gift Cards

Another embodiment of the disclosed systems and methods may be the creating or reloading of a gift card that may be used at any of a number of retailers. Such "anywhere" gift cards may be created for use anywhere the user desires, making them gift "wildcards" so to speak. For example, such gift "wildcards" may be based on the VISA® or MasterCard® network, and thus useable anywhere VISA or MasterCard is accepted. In other embodiments, the gift "wildcard" may be created for use at multiple distinct vendors, rather than simply a single vendor. However, such anywhere use gift card created in accordance with the disclosed principles could not only be customized and/or personalized as discussed herein, but also paid for at one kiosk location but printed/created (or reloaded in the case of a previously purchased gift card) at a second location. Such embodiments provide much more versatility in the receiver's use of the gift card, making them especially beneficial when the gift card is received by a user geographically distinct from the purchaser, such as a student away at school. Moreover, such an anywhere-use "gift wildcard" is advantageous since it may be used at any of a number of merchants/retailers, and may be obtained from a kiosk as disclosed herein in exchange for a consolidation/exchange of previously purchased merchant-specific gift or store credit cards.

Restricted Use Gift Cards

Another embodiment of the disclosed systems and methods may be the creating or reloading of a restricted or limited use gift card. Such restricted or limited use gift cards could be similar to the anywhere use gift cards discussed above in that they may be used at any of a number of vendors; however, that may be created with limits that prevent their use at certain vendors or for certain types of products or services. For example, a gift card could be created for use at any vendor except for liquor stores, adult-themed stores, tobacco shops, drug dispensaries or other types of vendors of goods or services where the purchaser of the limited use gift card does not want the receiver to use the card. Such an embodiment is particularly suited for families, where parents provide such a limited use gift card to their children, but having limits on where they may be used. Similarly, the limited use gift card may be created such that it may only be used at certain type of vendors, such as bookstores, gas stations, and office supply stores. Such limited use gift cards would be desirable if the receiver is a student and the purchaser would like to limit the student's use of the gift card to school-related purchases.

In still other embodiments, the gift card could be limited so that it excludes the purchase of certain types of products. Most if not all products today are packaged with a skew or other type of identifying number, which assists retailers in tracking inventory as well as other uses. Limited use gift cards as disclosed herein could be created such that they may be used at any retailer, but could not be used to purchase certain items. For example, the gift card could be created such that the receiver of such a limited use gift card could purchase almost any item at a grocery store, except for alcohol and/or tobacco products. In other embodiments, the purchase amounts may be limited such that only purchases below a certain maximum amount may be made with the gift card in an effort to curtail overspending. Such limitations on the retailers, spending limits, and/or products that may be purchased with the limited use gift card allows the disclosed gift card to be ideal for use as a "family gift card," where parents can provide their children any amount of funds via the gift card for use at a variety of retailers, but still place limits on its use at certain retailers and/or for purchasing certain goods or services, and only up a maximum amount per transaction. Such embodiments are a more desirable alternative to simply providing their children cash or even a credit card for their exclusive use in that protection against certain types of spending are still in place.

Limiting the use of a gift card as disclosed herein at particular merchants, or preventing use at particular merchants, may be done by interacting with the data collected and transmitted by the payment terminal at a merchant when purchases using cards or other payment vehicles are made. Conventionally, the payment terminals capture payment information from the purchaser from the card or other payment vehicle used with the payment terminal. That information, along with merchant identification information, is then transmitted to a payment processor from the terminal via a communications network. The merchant identification information could be used to identify at what merchant the disclosed gift card is being used, and then permit or prevent the payment processing to be completed. Similarly, payment terminals may be configured to capture skew or other product identifying data, along with the purchasing information, during a financial transaction. That product identification data may be used to allow or prevent certain goods from being purchased with the disclosed gift card right at the payment terminal and in real-time with the transaction by the user of the gift card. Other types of technologies may also be implemented with the disclosed limited use gift card to accomplish the same goals.

Even gift cards with geographical limits could be created using kiosks according to the disclosed principles. For example, a limited use gift card could be coded so that it may only be used at a retailer within a certain Zip code or other geographical boundary. In some embodiments, the gift card could be created with NFC technology, such as an embedded NFC chip, so that it may only be used when in proximity to the user's mobile telephone. The locations services on the phone could then be employed to ensure the limited use gift card is only being used with a particular geographic location, which can even include limitation to a particular retailer, etc. based on their geographic location. In other embodiments, the merchant identification information provided by the payment terminal as discussed above may be used to identify not only the merchant, but the merchant's location, especially in embodiments where a particular merchant has numerous locations. As before, the intercepting of that information from the payment terminal allows for placing real-time geographic restrictions on the purchases made using a limited use gift card as disclosed herein.

Still further, the limitations and restrictions that may be placed on a limited use gift card as disclosed herein may also be changeable by the purchaser or the user, perhaps with a predetermined access code, via a kiosk, if desired. The receiver of the limited use gift card, if given the capability, could simply visit their local kiosk with the gift card in order to modify the limitations placed on their family gift card by the purchaser. Moreover, such access and modifications may be made via a website associated with the vendor of the gift card if such capabilities have been established.

Limited Edition Gift Cards

Another embodiment of the disclosed systems and methods may be the creating or reloading of "limited edition" or "collector edition" gift cards. Such embodiments may provide for the creation of a limited number or run of such collector/limited edition gift cards. In this context, a limited run of gift cards would be only a predetermined number of gift cards being created with a given image and/or text. Thus, the purchaser would be purchasing, for example, 1 of only 500 cards available with such a certain theme. Exemplary limited edition gift cards could include gift cards having images of or otherwise related to movies, TV shows, and musical bands. Similarly, the limited edition gift cards could include images or other items related to specific persons/celebrities or items related to specific movies, TV shows or musical acts. Of course, other types of limited edition gift cards are also envisioned, and no limitation to just TV, movies or bands is intended.

Greeting Cards

Another embodiment of the disclosed systems and methods may be the creating of greeting cards being purchased or created at the kiosk by the purchaser. Such greeting cards could be premade greeting cards and selected via the kiosk, or may be customized by the purchaser using the kiosk as disclosed herein. Such greeting cards may be selected/designed alone by the purchaser via the kiosk and sent to a receiver via a second (or the same) kiosk, or may be transmitted to the receiver using any type of technique, such as email, messaging, and even the printing and mailing of a physical card (for example, using an affiliate associated with the kiosk) if that option is selected by the purchaser via the kiosk. Additionally, such optional greeting cards may be purchased and provided to a receiver along with a gift card that is purchased and provided as disclosed herein.

Ticketing

Another embodiment of the disclosed systems and methods may be the purchasing of tickets for certain events via the kiosk. Such tickets may be for the purchaser employing the kiosk, or may be provided to an intended receiver as disclosed herein. As such, purchased tickets may be provided via a gift card, or may be provided via a traditional printed ticket. Tickets may also be provided by eCode or "eTicket", where the ticket is provided digitally. These may be provided in any of a number of ways, such as an emailed eCode or other type of code (e.g., barcode, QR code, etc.), a messaged code, or even NFC transfer to a mobile device (of either the purchaser or the receiver of the ticket). Tickets purchased via a disclosed kiosk may include encoded tickets for events such as concerts, plays, and sporting events.

Streaming Cards

Another embodiment of the disclosed systems and methods may be the purchasing gifts in the form of gift cards or eCodes (or any other type of code) for downloading or streaming movies, shows, video games, or music. In exemplary embodiments, movies and video games may be selected by title, while music may be selected by musical artist/group name, album name or even track names. Such streaming cards or codes may be selected by the purchaser via the kiosk and sent to a receiver via a second (or the same) kiosk, or as before may be transmitted to the receiver using any type of technique, such as email, messaging, and even the printing and mailing of a physical card. Physical gift cards could include a code (e.g., bar code, QR code, etc.) for direct streaming of media content to the receiver's mobile phone or other device, computer, tablet, media streaming box, DVR, etc. Moreover, for physical streaming cards may also be purchased as limited edition cards, as discussed above, where the purchased item(s) may correspond to the imagery on the limited edition card.

Bulk Card Purchasing

In other advantageous embodiments in accordance with the disclosed principles, kiosks as disclosed herein may be employed for the bulk purchasing and printing of gift cards. Bulk purchasing herein refers to the purchase of three or more cards using a single transaction, but more practically includes the purchase of ten or more cards in a single transaction. In many instances, however, the bulk purchase may include upwards of dozens or even hundreds of cards in single transaction. Such bulk purchased gift cards may be printed at a remote printer physically separated from the kiosk through which the bulk purchase is made. Physically separated herein refers to a printing device that is not next to or in close proximity (i.e., within arm's length) of the kiosk used to create and order the bulk gift cards. Such bulk purchases are time consuming when conventionally made at a retail establishment, as the clerk is typically required to enter and encode each gift card of the bulk purchase individually. This tedious situation is exacerbated when multiple varieties/amounts of gift cards are bulk-purchased. Moreover, in addition to the time required to bulk produce and print a large number of gift cards for one transaction, completing a large bulk transaction exclusively on a single kiosk as disclosed herein could exhaust that kiosk of its entire inventory of card blanks, which would then limit the kiosk's use in future transactions until its inventory is replenished. Furthermore, the kiosk's card stacker may not contain a sufficient number of card blanks to fulfill the entire bulk order if the order is too large a number. The time constraint of awaiting the printing of a bulk purchase of gift cards from a single kiosk as disclosed herein may also be untenable to a user even if the kiosk was capable of printing the bulk order.

To address these issues associated with bulk gift card purchases, the disclosed principles also provide for the selection and ordering of the bulk gift cards via a kiosk as disclosed herein, but then transmitting the production and printing of the bulk gift cards to a remote gift card printer via a computer communications wide area network (WAN). Such a remote gift card printer would be physically distant from the kiosk though which the bulk order is placed, and in exemplary embodiments could be geographically separated from the retail establishment housing the kiosk. For example, the bulk printer could be located at a manufacturing facility typically associated with bulk printing of items, such as a local printing house or office supply store that customarily bulk-print items. Also, the remotely located bulk printer could be located at a commercial shipping facility for mailing of the produced bulk gift cards, or even at a retail shipping merchant, such as a FedEx Office® or UPS Store®, for either shipping of the produced bulk gift cards or to be made available for pickup by the purchaser or other authorized person. Still further, the remote printing equipment for printing the gift cards in bulk could be within the same retail establishment where the kiosk is located. In such embodiments, when a threshold number of gift cards are being purchased via the kiosk, the user may be notified that the gift cards will be produced via a remote printer and provided to the user at the same establishment (e.g., within a stated time) so that the user is not required to wait at the kiosk as all the bulk-ordered gift cards are produced and printed. In yet other embodiments, the bulk purchased gift cards could be shipped to the intended recipients if the contact information for the recipients is provided to the kiosk. For example, contact information of intended recipients may be provided by manual entry or may even be provided via data transfer from the user's mobile device, such as a near field or other wireless communication. Similarly, the bulk printed gift cards could be shipped to the company, and perhaps even to the targeted departments within the company, where they may be distributed to the intended recipients. In sum, the bulk purchased and produced gift cards may be received in any advantageous manner.

Employing kiosks as disclosed herein for such bulk gift card purchases may be similar to the techniques discussed above for non-bulk gift card purchases. For example, the user would interact with the kiosk using the Kiosk Processor Interface, and step through the offered options discussed above. In addition to simply selecting a large number of the same type of gift card for a bulk purchase, the kiosk would allow the user to select multiple varieties and amounts for the bulk gift card purchase. For example, if the user was purchasing bulk gift cards to be distributed to employees and/or affiliates of their company or organization, the user could select a first amount of gift cards for a first monetary value, then a second amount of gift cards for a second monetary value, and so on. In such an embodiment, the first set of gift cards could be for distribution to the administrative staff of the company, while the second set of gift cards could be for a higher value for distribution to upper level employees of the company. However, the bulk order could simply be placed during a single transaction at the kiosk, and thus paid for in a single transaction. The user could then also be offered a selection of locations where the bulk gift cards may be produced/printed, or even the option to have the bulk gift cards shipped to a desired location. The bulk order would then be transmitted from the kiosk to the selected remote printing location/facility for production. The bulk-produced gift card would then be available for pick up at the selected location (or shipped if that option is selected) at the date and time provided (or selected) by the user via the kiosk.

Moreover, a kiosk as disclosed herein may provide a number of additional options for such bulk gift card purchases. The bulk gift card platform disclosed herein offers personalization options that are not currently offered in-retail for bulk purchases for personal or business customers. In one embodiment, in addition to allowing a user to select varying amounts for various sets of gift cards, the kiosk may also provide the user with the option to "bulk personalize" the gift cards. For example, if a first set of bulk gift cards are intended for a certain group within a company, the user may use the kiosk to create a message on the gift cards personalized for that particular group, such as "Thank you for being the best administrative staff in world!" while the user may create a different personalized message for a second group of gift cards intended for a different group within the company. Similarly, in addition to different amounts, the user could select one type or brand of gift cards intended for one group and a different type or brand for another group. In addition, all of the gift card options discussed herein, such as card size, individual personalized messages (rather than group messages), color, graphics/images, logo (including the option to place the logo of the user's and/or recipients' company on the bulk gift cards) and/or the use of an NFC chip may also be made available to the user when making their bulk gift card purchase. Also as before, the user may be offered a discount or "bonus funds" if the gift cards are for use at the retail establishment where the kiosk is located, if desired. Still further, the amount of any such discount or bonus funds could be variable in proportion to the size and/or value amounts of the bulk gift card order, thus incentivizing not only the purchase of gift cards affiliated with the retailer housing the kiosk, but also the amount of value for the bulk-purchased gift cards. Such incentivizing based on the value of the bulk gift cards being purchased may also be provided for the merchant's or type of gift card being bulk ordered, and thus is not limited to simply gift cards for use at the retailer at which the kiosk is located.

In yet other embodiments, a user may employ a kiosk as disclosed herein to bulk purchase eCodes for gift cards to be distributed as desired. In such embodiments, the user may conduct a bulk purchase in the same or similar manner as discussed above for bulk purchasing of physical gift cards. As such, various sets of bulk purchase amounts, as well as bulk, group, or individualized personalization may be selected and purchased via a kiosk as disclosed herein. In these embodiments, however, instead of the bulk printing of gift cards provided by a remote printer or printing affiliate, the bulk purchase is solely for eCodes redeemable for gift cards. The bulk purchased eCodes may then be distributed to the intended recipients. Such distribution may be via any manner, such as through printed eCodes, electronically delivered eCodes, and even bulk purchased greeting cards having such eCodes included therein. Once received, recipients may then use their eCodes at a kiosk as disclosed herein to cause a physical gift card to be produced and printed at the kiosk in accordance with the features and details associated with the eCode. In other embodiments, the eCodes may be employed in a digital manner within, for example, a mobile device application employable for organizing and storing electronic gift cards and other types of payment vehicles. In such embodiments, the need for bulk printing of physical gift cards all at once may be eliminated.

Bulk purchasing at a kiosk as disclosed herein may also be for bulk greeting cards. As discussed above, disclosed kiosks may be used for designing, purchasing and printing greeting cards, with or without an associated gift card or eCode, and thus a user may also employ a disclosed kiosk to bulk purchase greeting cards. For example, it is very typical to send numerous holiday cards to friends, colleagues and clients of one's company and/or profession during the holiday season. A user could therefore employ a kiosk as disclosed herein to bulk design and purchase such greeting cards. As with bulk gift card purchasing, the bulk greeting cards could also be all the same or could be separated into various groups, as well as optional group and/or individual personalization. The bulk purchased greeting cards could then be printed, as discussed above, at a remote printer for either pickup by the user, shipping to the user, or even direct shipping to the intended recipients.

Also, in all embodiments, disclosed kiosks employed for bulk gift card purchasing may include all of the features discussed above, including consolidation of preexisting gift cards for value, which can be applied to the bulk gift or greeting card purchase. In advantageous embodiments, the user could import a preset selection of contacts (e.g., from the user's mobile device) as the intended recipients of the bulk greeting cards, bulk gift cards or bulk eCodes to ease the bulk purchasing process. Such importing may be using any manner, including wireless communication with the user's mobile device. Moreover, my importing the intended recipients in an automated manner, kiosks as disclosed herein may also offer the option to simply mail each of the bulk purchased cards, or electronically transmit each of the bulk purchased eCodes, to the contact information associated with each intended recipient in the user's imported contact list. In such embodiments, the bulk purchasing provided by a disclosed kiosk is even more convenient for the user in that once the desired selections and options are made for the bulk purchase, the user would not need to pick up and handle the delivery of the bulk purchased cards.

Furthermore, the disclosed kiosks may permit the user to create a user profile that is stored in an affiliated database, which would allow the user to save their bulk purchase selections, preferences, and even the list of intended recipients (and any division and personalization associated with the intended recipients) so that future bulk purchases are simplified even further.

Virtual Kiosks

The principles disclosed herein also expand the gift card marketplace by providing gift card virtual kiosk applications, accessible on any online platform or device. In exemplary embodiments, such virtual kiosk applications may be accessed and managed by unique codes, such as tailored QR codes, that permit a user/customer access to the virtual kiosk interface. Such virtual kiosk applications may additionally be used to track each retailer's/owner's/participant's location to record their sales of gift cards, no matter where their uniquely tailored QR code or virtual kiosk application is used.

Such QR codes/virtual kiosk applications may be placed on any digital touch or information screen platform or physical kiosk, or in any physical display location, for example, ATMs, reverse ATMs, crypto ATMs, bill pay kiosks, advertising, consumer wayfinding (e.g., mall navigation, etc.), and in any such location without cost or integration requirements required of the providing or displaying owners/retailers/participants. All that is required is the posting of the unique code, and customers can quickly and easily access a virtual kiosk by scanning, entering, etc. the unique code. Such anytime/anywhere on demand virtual kiosk applications provide owners/retailers/participants with additional revenues and consumers with instant, secure connectivity to such a virtual kiosk in the form of an online website, mobile application, or similar connected interface, with direct access to purchase, send, reload, or exchange gift cards, just like using a physical kiosk of the type disclosed herein. These include open or closed loop gift cards, as well as audio/video messaging, personalized greeting cards, ticketing, physical and digital/virtual/eCode gift cards, movies and similar media, games and similar media, and eBooks and similar media, or any other type of card or equivalent value note or marker or media disclosed herein or later developed.

Gift cards purchased via such a virtual kiosk application can be electronic/virtual gift cards, such as via an eCode as discussed above, or may be provided as a physical gift card in any manner disclosed herein. Virtual gift cards may be created and activated in seconds, and then texted or emailed or otherwise electronically delivered with all of the brand requirements, terms and conditions, etc. to a consumer. Moreover, a virtual kiosk application or platform as disclosed herein may also create and provide a customer an ewallet in which their virtual gift card or eCode gift card may be held. Alternatively, their virtual gift card or eCode gift card may be placed in the customer's existing ewallet if they already have one by providing the virtual kiosk a mobile device number or other identifier for accessing the eWallet. Physical gift cards can be created at a secure location and mailed to the consumer, or may be created/printed at a physical kiosk, the location(s) of which may be provided to the consumer via the virtual kiosk application. Still further, bulk purchased gift cards may be provided at a bulk printing location in the manner discussed above, and bulk virtual gift cards may be mass-emailed or otherwise electronically delivered to one or more designated recipients.

Advantages of a virtual kiosk application as disclosed herein include an expansion for consumers to purchase or reload any number of brands of gift cards. As with physical kiosks of the type disclosed herein that can print any brand or type of gift card selected by a consumer, a virtual kiosk application in accordance with the disclosed principles can provide consumers with a similar choice of any gift card offerable for sale, reload, or even consolidation, on the virtual kiosk application. Such virtual/digital gift cards may be searched for on a disclosed virtual kiosk application by brand name, category of goods/services, or any other advantageous searching terms or means. Similarly, gift cards purchased via a virtual kiosk application can be purchased in any denomination a consumer desires. Reloading or consolidating gift cards on a disclosed virtual kiosk is just as easy as doing so on any retailer/provider website. A customer need only provide their existing gift card information to the virtual kiosk interface, and then select whether the customer would like to reload value onto that gift card, consolidate that gift card value for another brand, etc. of gift card, or even transfer that gift card to another person. Moreover, customers may use a virtual kiosk to convert a physical gift card into a digital/virtual gift card using the same process, where the virtual gift card may then be emailed, texted, or otherwise digitally provided to the customer. Such use of a virtual kiosk is advantageous for customers that do not want to carry physical gift cards due to the risk of losing them or forgetting them when they might end up needing them.

Thus, a virtual kiosk in accordance with the disclosed principles is not simply an advantageous way to permit customers access to a kiosk with all of the functionality as disclosed herein, but also to use that functionality to convert physical gift cards into digital gift cards, or to transfer physical gift cards to another person by either transforming them into digital gift cards sent to the person or into a communication to the person to visit a physical kiosk in order to print the gifted card, or even into a physical gift card to be mailed to the person. Of course, as discussed herein, all of this same functionality may also be provided via a disclosed physical kiosk, and such that the receiving person accesses their gifted gift card via them accessing a disclosed virtual kiosk. This may be provided again via a unique code that may accompany the communication informing of the transfer of the gift card from the original customer, and which is used by the receiving person to access the virtual kiosk to receive the transfer.

An additional advantage of a virtual kiosk application provided on any connected platform or device is being eco-friendly by eliminating card stock, printing ink, card backers, clam shell packaging and in store displays, in addition to the materials used to construct a physical kiosk in the first place. Also, a virtual kiosk as disclosed herein is provided by an easily downloadable app/QR code for consumers to access on their mobile device or computers for anytime/anywhere purchases with automated point of sale revenues sent directly back to the originator of the virtual kiosk QR code/app. Consumers may also have the option to send a virtual/digital gift card to a third-party to access via their mobile device or computer with the option to include a greeting card and/or personalized audio/video message as discussed in detail above.

System Summary

The present invention system anticipates a wide variety of variations in the basic theme of kiosk gift card system, but can be generalized as a kiosk gift card system in a retail establishment comprising:
 (a) kiosk processor interface;
 (b) gift card management server;
 (c) card reader; and
 (d) gift card dispenser;
 wherein
 the kiosk processor interface is configured to enable users to interact with the gift card management server;
 the gift card management server is configured to connect to a network;
 the gift card management server is configured to provide the users with options to purchase user-selected gift cards; and
 the gift card dispenser is configured to print the user-selected gift cards upon receiving payment through the card reader.

This general system summary may be augmented by the various elements described herein to produce a wide variety of invention embodiments consistent with this overall design description.

Method Summary

The present invention method anticipates a wide variety of variations in the basic theme of implementation, but can be generalized as a kiosk gift card system purchase method wherein the method is performed on a kiosk gift card system comprising:
 (a) kiosk processor interface;
 (b) gift card management server;
 (c) card reader; and
 (d) gift card dispenser;
 wherein
 the kiosk processor interface is configured to enable users to interact with the gift card management server;
 the gift card management server is configured to connect to a network;
 the gift card management server is configured to provide the users with options to purchase user-selected gift cards or to add funds to used gift cards; and
 the gift card dispenser is configured to print the user-selected gift cards, or returning a reloaded gift card, upon receiving payment through the card reader;
 wherein the method comprises the steps of:
 (1) clicking on the kiosk processor interface;
 (2) browsing through a list of vendors;
 (3) selecting a vendor to purchase a gift card or gift card funds from the vendor;
 (4) requesting a monetary amount to apply to the gift card;
 (5) paying the monetary amount;
 (6) printing and/or dispensing the gift card; and
 (7) collecting the gift card.

This general method summary may be augmented by the various elements described herein to produce a wide variety of invention embodiments consistent with this overall design description.

System/Method Variations

The present invention anticipates a wide variety of variations in the basic theme of kiosk gift card system. The examples presented previously do not represent the entire scope of possible usages. They are meant to cite a few of the almost limitless possibilities.

This basic system and method may be augmented with a variety of ancillary embodiments, including but not limited to:
 An embodiment wherein the gift card management server is further configured to communicate via the network with:
  (a) vendor management server;
  (b) payment server;
  (c) vendor database; and
  (d) advertising server
  wherein
  the vendor management server is configured to communicate with plural vendors to submit user requests for gift cards;
  the plural vendors are configured to respond to the user requests with the network;
  the vendor database is configured to store and maintain data related to the plural vendors;
  the payment server is configured to accept payments for the gift cards; and
  the advertising server is configured to display advertisements on the kiosk processor interface.
 An embodiment wherein the kiosk processor interface is a touch interface.
 An embodiment wherein the kiosk processor interface is a graphical interface.
 An embodiment wherein the network is wired.
 An embodiment wherein the network is wireless.

One skilled in the art will recognize that other embodiments are possible based on combinations of elements taught within the above invention description.

Conclusion

A kiosk gift card system and method for purchasing gift cards at a kiosk has been disclosed. The system/method includes a gift card distribution kiosk located at a retail establishment that provides a user with access to a multitude of different forms of gift cards that may be purchased and printed onto a customizable card with a personalized message. The kiosk includes a kiosk processor interface, a gift card dispenser, a card reader and gift card management server connected to a network. The gift card management server, through the kiosk processor interface, provides vendor options to users to select and pay via the card reader. In another embodiment, the kiosk is used to redeem unused user gift cards for a reduced value user selected gift card, reduced cash value, store credit, full or reduced value store card, rewards points, bank debit, and/or electronic code user towards online purchases.

What is claimed is:

1. A virtual kiosk gift card system accessible via a communications network, the system comprising one or more computing devices comprising:
   (a) a kiosk processor interface;
   (b) a gift card management server;
   (c) a payment processor; and
   (d) a virtual gift card transmission unit; and
   (e) an identification code unique to the kiosk processor interface;
   wherein:
   the kiosk processor interface is configured to electronically communicate with said gift card management server through the network;
   the identification code providing users access to the kiosk processor interface, via each user's computing device connected to the network, when employing the identification code with the user computing devices;
   the kiosk processor interface is configured to enable the users to interact with the gift card management server via each user's computing device;
   the gift card management server is configured to provide the users with options to purchase user-selected virtual gift cards via the kiosk processor interface;
   the kiosk processor interface is configured to permit users to select a specific retailer or subject matter for the purchased user-selected virtual gift cards;
   the kiosk processor interface is configured to permit users to assign a value to the purchased user-selected virtual gift cards;
   the gift card management server is configured to provide the users with options to redeem value within or consolidate monetary value from within one or more pre-existing gift cards into one or more virtual gift cards via the kiosk processor interface;
   the kiosk processor interface is configured to cause the creation of any user-selected virtual gift cards; and
   the gift card transmitter is configured to transmit virtual user-selected gift cards upon receiving payment information from the users via the kiosk processor interface.

2. The virtual kiosk gift card system of claim 1, wherein the gift card management server is further configured to communicate to the kiosk processor interface via the network using:
   (a) a vendor management system (VMS);
   (b) a payment server;
   (c) a vendor database; and
   (d) an advertising server;
   wherein:
   said VMS is configured to communicate with a plurality of vendors to submit user requests for virtual gift cards;
   said plurality of vendors are configured to respond to said user requests via the network;
   said vendor database is configured to store and maintain data related to the plurality of vendors;
   said payment server is configured to accept payments for the purchased virtual gift cards; and
   said advertising server is configured to display advertisements on the kiosk processor interface.

3. The virtual kiosk gift card system of claim 1, wherein said gift card value is associated with a discounted value of said one or more pre-existing gift cards.

4. The virtual kiosk gift card system of claim 1, wherein said kiosk processor interface is configured to redeem one or more of said pre-existing gift cards and consolidate the monetary value of said pre-existing gift cards in a bank account specified by a corresponding user.

5. The virtual kiosk gift card system of claim 1, wherein said kiosk processor interface is an interactive graphical user interface.

6. The virtual kiosk gift card system of claim 1, wherein said identification code is a scannable code, wherein scanning by a user computing devices causes said access to the kiosk processor interface.

7. The virtual kiosk gift card system of claim 6, wherein the scannable code is a QR code.

8. The virtual kiosk gift card system of claim 2, wherein the user-selected virtual gift cards are merchant-agnostic and thereby useable at a plurality of different merchants.

9. The virtual kiosk gift card system of claim 8, wherein at least one of the plurality of vendors comprises a processor of payments between merchants and financial institutions, wherein created virtual gift cards associated with said at least one vendor are useable at a plurality of different merchants.

10. The virtual kiosk gift card system of claim 2, wherein said gift card management server is further configured to communicate to the kiosk processor interface via the network using an advertising server, wherein said advertising server is configured to display advertisements on the kiosk processor interface.

11. A method of creating virtual gift cards, the method comprising:
   providing an identification code unique to a kiosk processor interface, wherein the kiosk processor interface is configured to electronically communicate with a gift card management server through the network;
   permitting access to the kiosk processor interface via a user computing device in response to a scan of the identification code by the user computing device;
   permitting, via the kiosk processor interface, interaction by the user with the gift card management server via the user's computing device, wherein the gift card management server is configured to provide the user with options to purchase user-selected virtual gift cards via the kiosk processor interface;
   receiving, via the kiosk processor interface, a selection by the user of a specific retailer or subject matter for the purchase of a user-selected virtual gift card;
   receiving, via the kiosk processor interface, a selection by the user of a value to assign to the purchase of a user-selected virtual gift card;
   presenting, by the gift card management server and via the kiosk processor interface, options to the user to redeem value within or consolidate monetary value from within one or more pre-existing gift cards into one or more virtual gift cards;
   receiving, via the kiosk processor interface, payment information from the user for creation of any user-selected virtual gift card;
   causing, in response to receiving the payment information and via the kiosk processor interface, creation of any user-selected virtual gift card; and
   causing, via a transmission unit associated with the kiosk processor interface, transmission of any created virtual user-selected gift card in response to receiving the payment information.

12. The method of claim 11, wherein the gift card management server is further configured to communicate to the kiosk processor interface via the network using:
   (a) a vendor management system (VMS);
   (b) a payment server;
   (c) a vendor database; and
   (d) an advertising server;

wherein:
said VMS is configured to communicate with a plurality of vendors to submit user requests for virtual gift cards;
said plurality of vendors are configured to respond to said user requests via the network;
said vendor database is configured to store and maintain data related to the plurality of vendors;
said payment server is configured to accept payments for the purchased virtual gift cards; and
said advertising server is configured to display advertisements on the kiosk processor interface.

13. The method of claim 11, wherein said gift card value is associated with a discounted value of said one or more pre-existing gift cards.

14. The method of claim 11, wherein said kiosk processor interface is configured to redeem one or more of said pre-existing gift cards and consolidate the monetary value of said pre-existing gift cards in a bank account specified by a corresponding user.

15. The method of claim 11, wherein said kiosk processor interface is an interactive graphical user interface.

16. The method of claim 11, wherein said identification code is a scannable code, scannable by the user computing device.

17. The method of claim 16, wherein the scannable code is a QR code.

18. The method of claim 12, wherein the user-selected virtual gift cards are merchant-agnostic and thereby useable at a plurality of different merchants.

19. The method of claim 18, wherein at least one of the plurality of vendors comprises a processor of payments between merchants and financial institutions, wherein created virtual gift cards associated with said at least one vendor are useable at a plurality of different merchants.

20. The method of claim 12, wherein said gift card management server is further configured to communicate to the kiosk processor interface via the network using an advertising server, wherein said advertising server is configured to display advertisements on the kiosk processor interface.

\* \* \* \* \*